United States Patent
Hatasaki et al.

(10) Patent No.: US 8,041,986 B2
(45) Date of Patent: Oct. 18, 2011

(54) TAKE OVER METHOD FOR COMPUTER SYSTEM

(75) Inventors: Keisuke Hatasaki, Kawasaki (JP); Masayoshi Kitamura, Ayase (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/732,579

(22) Filed: Mar. 26, 2010

(65) Prior Publication Data

US 2010/0180148 A1      Jul. 15, 2010

Related U.S. Application Data

(63) Continuation of application No. 11/693,978, filed on Mar. 30, 2007, now Pat. No. 7,711,983.

(30) Foreign Application Priority Data

Oct. 11, 2006  (JP) ................................. 2006-277738

(51) Int. Cl.
    *G06F 11/00* (2006.01)
(52) U.S. Cl. ........... 714/4.12; 714/4.11; 714/10; 714/13
(58) Field of Classification Search ............. 714/3, 4.11, 714/4.12, 10, 13
See application file for complete search history.

(56) References Cited

U.S. PATENT DOCUMENTS

| | | | |
|---|---|---|---|
| 6,230,285 B1 | 5/2001 | Sadowsky et al. |
| 6,859,889 B2 | 2/2005 | Matsuura et al. |
| 6,922,791 B2 | 7/2005 | Mashayekhi et al. |
| 7,062,674 B2 | 6/2006 | Takamoto |
| 2003/0217088 A1 | 11/2003 | Takamoto |
| 2006/0015773 A1 | 1/2006 | Singh et al. |
| 2006/0143498 A1 | 6/2006 | Hatasaki et al. |
| 2006/0174087 A1 | 8/2006 | Hashimoto et al. |
| 2007/0260913 A1 | 11/2007 | Hatasaki et al. |
| 2008/0294933 A1 | 11/2008 | Nishii et al. |

FOREIGN PATENT DOCUMENTS

| | | | |
|---|---|---|---|
| JP | 2001-306349 A | 11/2001 |
| JP | 2005-250839 A | 9/2005 |
| JP | 2006-163963 | 6/2006 |
| JP | 2006-209487 A | 8/2006 |

*Primary Examiner* — Michael Maskulinski
(74) *Attorney, Agent, or Firm* — Mattingly & Malur, PC

(57) ABSTRACT

A proposed fail over method for taking over task that is preformed on an active server to a backup server, even when the active server and the backup server have different hardware configuration. The method for making a backup server take over task when a fault occurs on a active server, comprises steps of acquiring configuration information on the hardware in the active server and the backup server, acquiring information relating the hardware in the backup server with the hardware in the active server, selecting a backup server to take over the task that is executed on the active server where the fault occurred, creating logical partitions on the selected backup server, and taking over the task executed on the active server logical partitions, in the logical partitions created on the selected backup server.

8 Claims, 22 Drawing Sheets

HARDWARE CONFIGURATION TABLE 410

| 501 | 502 | 503 | 504 | 505 |
|---|---|---|---|---|
| SERVER IDENTIFIER | APPLICATION | CPU STRUCTURE | MEMORY STRUCTURE | DEVICE STRUCTURE |
| S1 | ACTIVE | 0:IX306 0/1<br>1:IX306 0/1 | 0:0 - 2047<br>1:2048 - 4095 | 0:0:NIC 0(MAC1)<br>1:0:HBA 0(WWN1)/1(WWN2) |
| S2 | ACTIVE | 0:IX306 0/1 | 0:0 - 511<br>1:512 - 1 023 | 0:0:NIC 1(MAC2)<br>0:1:HBA 0(WWN3)<br>1:0:HBA 1(WWN4) |
| S3 | ACTIVE | 0:IX306 0/1<br>1:IX306 0/1<br>2:IX306 0/1<br>3:IX306 0/1 | 0:0 - 2047<br>1:2048 - 4095 | 0:0:NIC 0(MAC3)/1(MAC4)<br>1:0:HBA 0(WWN5)/1(WWN6) |
| S4 | ACTIVE | 0:IX306 0<br>1:IX306 0<br>2:IX306 0<br>3:IX306 0 | 0:0 - 2047<br>1:2048 - 4095<br>2:4096 - 6143<br>3:6144 - 8192 | 0:0:NIC 0(MAC5)/1(MAC6)<br>1:0:HBA 0(W WN7)/1(WWN8) |
| S5 | STANDBY | 0:IX306 0/1<br>1:IX306 0/1<br>2:IX306 0/1<br>3:IX306 0/1 | 0:0 - 2047<br>1:2048 - 4095<br>2:4096 - 6143<br>3:6144 - 8192 | 0:0:NIC 0(MAC7)<br>1:0:NIC 0(MAC8)<br>2:0:HBA 0(WWN9)/1(WWN10) |
| S6 | STANDBY | 0:IX306 0/1 | 0:0 - 4095<br>1:4096 - 8191 | 0:0:NIC 0(MAC9)<br>1:0:HBA 0(WWN11)/1(WWN12) |

RESOURCE REMAPPING TABLE 411

| HARDWARE | S1 | S5 | S6 |
|---|---|---|---|
| CPU | 0:IX306 0 | 0:IX306 0 | 0:IX306 0 (share) |
|  | 0:IX306 1 | 0:IX306 1 | 0:IX306 1 (share) |
|  | 1:IX306 0 | 1:IX306 0 | 0:IX306 0 (share) |
|  | 1:IX306 1 | 1:IX306 1 | 0:IX306 1 (share) |
| MEMORY | 0:0 - 2047 | 0:0 - 2047 | 0:0 - 2047 |
|  | 1:2048 - 4095 | 1:2048 - 4095 | 0 :2048 - 4095 |
| DEVICE | 0:0:NIC 0 | 0:0:NIC 0 | 0:0:NIC 0 |
|  | 1:0:HBA 0 | 2:0:HBA 0 | 1:0:HBA 0 |
|  | 1:0:HBA 1 | 2:0:HBA 1 | 1:0:HBA 1 |

601 602 603 604

NUMBER OF ACTIVE SERVER UNITS

FIG. 6

RESOURCE MAPPING TABLE 910

| LOGICAL PARTITION IDENTIFIER (1001) | HARDWARE (1002) | MAPPING (1003) |
|---|---|---|
| L1 | CPU | 0:IX306 0/1<br>1:IX306 0/1 |
| | MEMORY | 0:0 - 2047<br>1:2048 - 4095 |
| | DEVICE | 0:0:NIC 0(MAC7)<br>2:0:HBA 0(WWN9)/1(WWN10) |
| L2 | CPU | 2:IX306 0/1<br>3:IX306 0/1 |
| | MEMORY | 2:4096 - 6143<br>3:6144 - 8191 |
| | DEVICE | 1:0:NIC 0(MAC 8) |

FIG. 10

IDENTIFIER CONVERSION TABLE 911

| LOGICAL PARTITION IDENTIFIER (1101) | HARDWARE (1102) | IDENTIFIER (1103) | CONVERTED (1104) |
|---|---|---|---|
| L1 | CPU | 0:IX306 0 | 0:IX306 0 |
| | | 0:IX306 1 | 0:IX306 1 |
| | | 1:IX306 0 | 1:IX306 0 |
| | | 1:IX306 1 | 1:IX306 1 |
| | MEMORY | 0:0 - 2047 | 0:0 - 2047 |
| | | 1:2048 - 4095 | 1:2048 - 4095 |
| | DEVICE | 0:0:NIC 0 (MAC7) | 0:0:NIC 0 (MAC1) |
| | | 2:0:HBA 0 (WWN9) | 1:0:HBA 0 (WWN1) |
| | | 2:0:HBA 1 (WWN10) | 1:0:HBA 1 (WWN2) |

FIG. 11

NETWORK CONFIGURATION TABLE 412

| SERVER IDENTIFIER (2001) | NETWORK-RELATED HARDWARE (2002) | CONNECTION (2003) |
|---|---|---|
| S1 | 0:0:NIC 0(MAC1) | NW - SW0 |
|  | 1:0:HBA 0(WWN1) | FC - SW0 |
|  | 1:0:HBA 1(WWN2) | FC - SW1 |
|  |  |  |
| S2 | 0:0:NIC 1(MAC2) | NW - SW0 |
|  | 0:1:HBA 0(WWN3) | FC - SW0 |
|  | 1:0:HBA 1(WWN4) | FC - SW1 |
|  |  |  |
| S3 | 0:0:NIC 0(MAC3) | NW - SW0 |
|  | 0:0:NIC 1(MAC4) | NW - SW1 |
|  | 1:0:HBA 0(WWN5) | FC - SW1 |
|  | 1:0:HBA 1(WWN6) | FC - SW0 |
| S4 | 0:0:NIC 0(MAC5) | NW - SW0 |
|  | 0:0:NIC 1(MAC6) | NW - SW0 |
|  | 1:0:HBA 0(WWN7) | FC - SW0 |
|  | 1:0:HBA 1(WWN8) | FC - SW1 |
| S5 | 0:0:NIC 0(MAC7) | NW - SW0 |
|  | 1:0:NIC 0(MAC8) | NW - SW1 |
|  | 2:0:HBA 0(WWN9) | FC - SW0 |
|  | 2:0:HBA 1(WWN10) | FC - SW1 |
| S6 | 0:0:NIC 0(MAC9) | NW - SW0 |
|  | 1:0:HBA 0(WWN11) | FC - SW0 |
|  | 1:0:HBA 1(WWN12) | FC - SW1 |
|  |  |  |

FIG. 20

REMAPPING TABLE OF S3  411

| HARDWARE | S 3 | S 5 | S 6 |
|---|---|---|---|
| CPU | 0:IX306 0 | 0:IX306 0 | 0:IX306 0 (share) |
| | 0:IX306 1 | 0:IX306 1 | 0:IX306 1 (share) |
| | 1:IX306 0 | 1:IX306 0 | 0:IX306 0 (share) |
| | 1:IX306 1 | 1:IX306 1 | 0:IX306 1 (share) |
| | 2:IX30 6 0 | 2:IX306 0 | 0:IX306 0 (share) |
| | 2:IX306 1 | 2:IX306 1 | 0:IX306 1 (share) |
| | 3:IX306 0 | 3:IX306 0 | 0:IX306 0 (share) |
| | 3:IX306 1 | 3:IX306 1 | 0:IX306 1 (share) |
| MEMORY | 0:0 - 2047 | 0:0 - 2047 | 0:0 - 2047 |
| | 1:2048 - 4095 | 1:2048 - 4095 | 0:2048 - 4095 |
| DEVICE | 0:0:NIC 0 | 0:0:NIC 0 | 0:0:NIC 0 |
| | 0:0:NIC 1 | 1:0:NIC 0 | Not exist |
| | 1:0:HBA 0 | 2:0:HBA 1 | 1:0:HBA 1 |
| | 1:0:HBA 1 | 2:0:HBA 0 | 1:0:HBA 0 |

TAKE OVER METHOD FOR COMPUTER SYSTEM

CROSS REFERENCES

This is a continuation application of U.S. Ser. No. 11/693,978, filed Mar. 30, 2007 (now U.S. Pat. No. 7,711,983), the entire disclosure of which is hereby incorporated by reference.

CLAIM OF PRIORITY

The present application claims priority from Japanese patent application JP 2006-277738 filed on Oct. 11, 2006, the content of which is hereby incorporated by reference into this application.

BACKGROUND OF THE INVENTION

The present invention relates to a method for replacing the server and recovering from the fault when a fault has occurred in the server for a computer system.

When a fault has occurred in a currently used server while performing tasks in a computer system comprising multiple servers, the tasks being performed on that server come to a stop. Methods are therefore available to reduce the amount of operation down time and improve computer usability by replacing the server with another server and then continuing to perform the computer tasks.

An one fail over method for example is disclosed in JP 2006-163963 A which, when a fault occurs in the active server, a backup server not currently running a task, starts up a boot disk (logic unit) utilized by the active server where the fault occurred, in order to take over the tasks or duties of server where the fault occurred. In this method, when there are multiple active servers on a computer system, the backup server can take over the boot disk used by the active server where the fault occurred to allow fail over regardless of which server where the error occurred. This method is highly reliable since a small number of backup servers are prepared for a large number of active servers. Moreover, there is no need to form software such as an OS (operating system) in advance on the backup server. In other words, there is no need to contrive a backup server compared to fail over methods such as hot-standby.

SUMMARY OF THE INVENTION

In the method for taking over server operation in the related art, the backup server takes over the unchanged boot disk of the active server, so that the backup server can take over the software settings and operating system operated by the active server. Therefore when the hardware structure and the network connections used by the active server and the backup server are different from each other, then those settings dependent on the network and the hardware for the software and the operating system used on the active server and the backup server will not match each other. The related art in that case had the problem that the operating system and the software will not operate correctly on the backup server, and the tasks run on the active server cannot be resumed or recovered.

The present invention has the object of providing a computer system capable of recovering tasks run by the active server by booting the backup server with the unchanged boot disk utilized by the active server even in cases where the hardware structure and the network connections of the active server and the backup server are different from each other.

A typical example of this invention is described as follows. A fail over method executed by a management server on a computer system including a management server, and one or more active servers performing tasks, and one or more backup servers, for making the backup server take over the task when a fault occurs on the active server, and characterized in that one or more logical partitions are created on the backup server, and the backup server includes a resource mapping program executed by the operating system in each of the logical partitions created on the backup server; and the method comprises: a relation acquisition step for acquiring configuration information on the hardware included in the active server and the backup server, and acquiring hardware relation information showing relation between hardware included in the backup server and hardware included in the active server; a backup server selecting step for selecting a backup server to take over the task that is performed on the active server in which a fault occurred, based on the hardware relation information and the hardware configuration information of the backup server and the active server when the fault has occurred in the active server; a partition creating step for creating logical partitions on the selected backup server based on the hardware relation information and the hardware configuration information on the backup server and the active server and; a takeover step for taking over task that is performed on the active server, to the logical partitions created on the selected backup server.

The fail over method of this invention is capable of task recovery when a fault has occurred in the active server performing task, by booting a backup server not running tasks, with the boot disk utilized by the active server. The user can in particular change the server running tasks without having to change the contents of the boot disk, even when the hardware configuration and the network connections the active server and the backup server are different.

The fail over method of this invention allows shifting between and operating tasks even on servers with different hardware configurations so that the server hardware is simple to maintain.

BRIEF DESCRIPTION OF THE DRAWINGS

The present invention can be appreciated by the description which follows in conjunction with the following figures, wherein:

FIG. 5 shows the structure of the hardware configuration table of the first embodiment;

FIG. 6 shows the structure of the remapping table of the first embodiment;

FIG. 10 shows the structure of the resource mapping table of the first embodiment;

FIG. 11 shows the structure of the identifier conversion table of the first embodiment;

FIG. 20 shows the network configuration table of the second embodiment;

FIG. 22 shows the configuration of the remapping table of the second embodiment.

DESCRIPTION OF THE PREFERRED EMBODIMENTS

Figure 1:
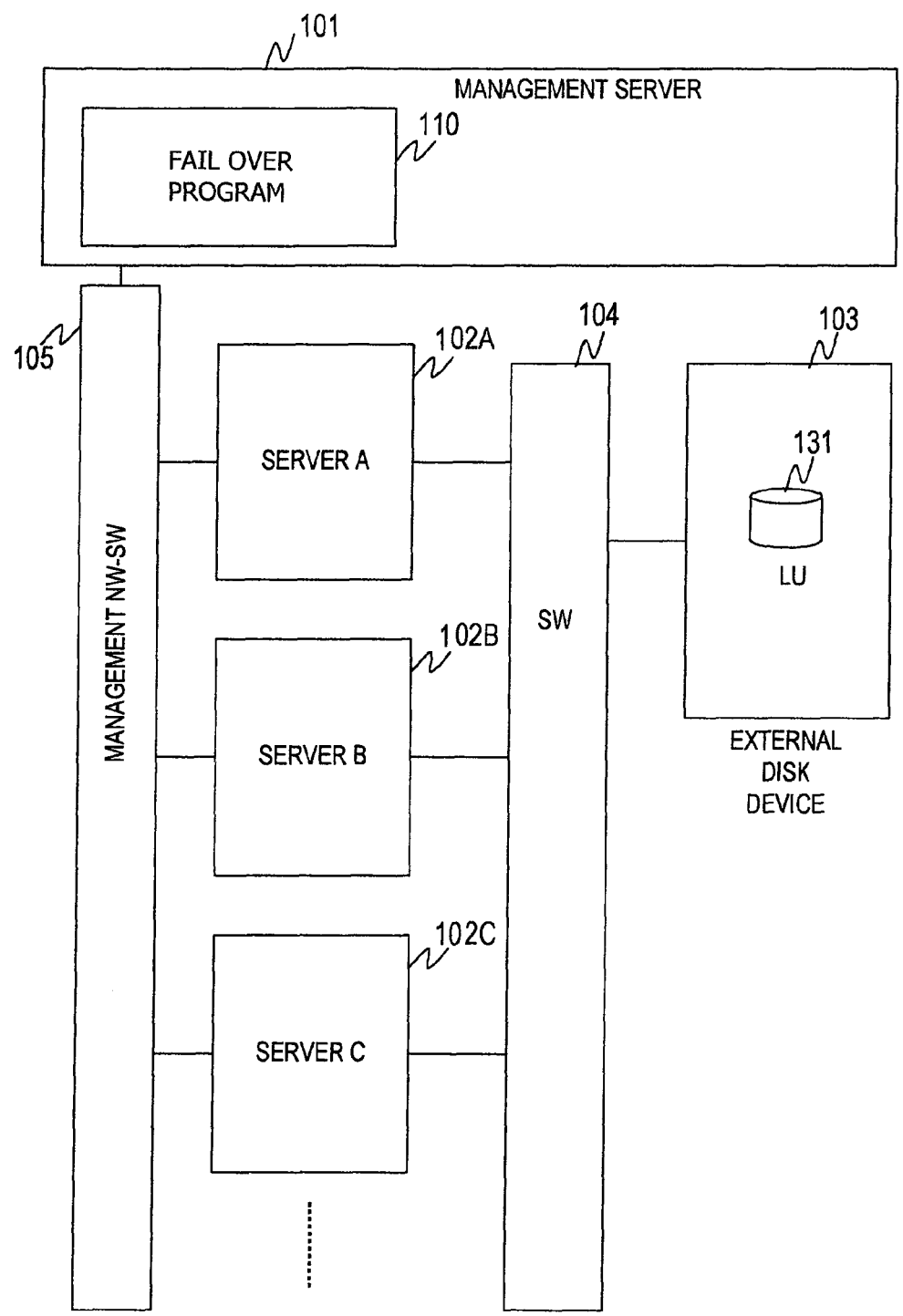
FIG. 1 is a block diagram showing the overall configuration of the computer system of the first embodiment.

The embodiments of this invention are described next while referring to the drawings.

First Embodiment

FIG. 1 is a block diagram showing the overall configuration of the computer system of the first embodiment.

The computer system of the first embodiment comprises a management server 101, multiple servers 102A to 102C, an external disk device 103, a switch 104 and a management network switch 105.

The management server 101 executes a fail over program 110 to perform recovery operation from a fault that occurred on the servers 102A to 102C. When a fault has occurred on the server 102A to 102C, the fail over program 110 switches to a server different from the server where the fault occurred, and takes over to assume the tasks of the faulty server.

The servers 102A to 102C execute a program to provide the specified task. Each of the servers 102A to 102C may utilize respectively different hardware configurations.

The external disk device 103 stores data used by the servers 102A to 102C. A disk array device comprising multiple disks or a file server may serve as the external disk device 103. The external disk device 103 provides the logic unit 131 to the servers 102A to 102C. The server 102A to 102C. stored data utilized by the application that was started and the boot images holding the required programs and parameters for starting the operating system and the applications. Access from each of the servers 102A to 102C to the logic unit 131 may be restricted by setting the security level on the switch 104 and the external disk device 103. Multiple logic units 131 may be utilized.

The switch 104 connects to the servers 102A to 102C and to the external disk device 103 to make up the network. Besides an SAN switch handling fiber channel protocols, the switch 104 may also utilize switches for handling Ethernet protocols (protocols such as I-SCSI, NFS). The servers 102A to 102C can in this way access the logic unit 131 of external disk device 103. The servers 102A to 102C may also connect directly to the external disk device 103 without connecting via the switch 104.

The management network switch 105 connects to the management server 101 and the servers 102A to 102C to make up the management network. The management network may for example utilize the Ethernet.

Figure 2:
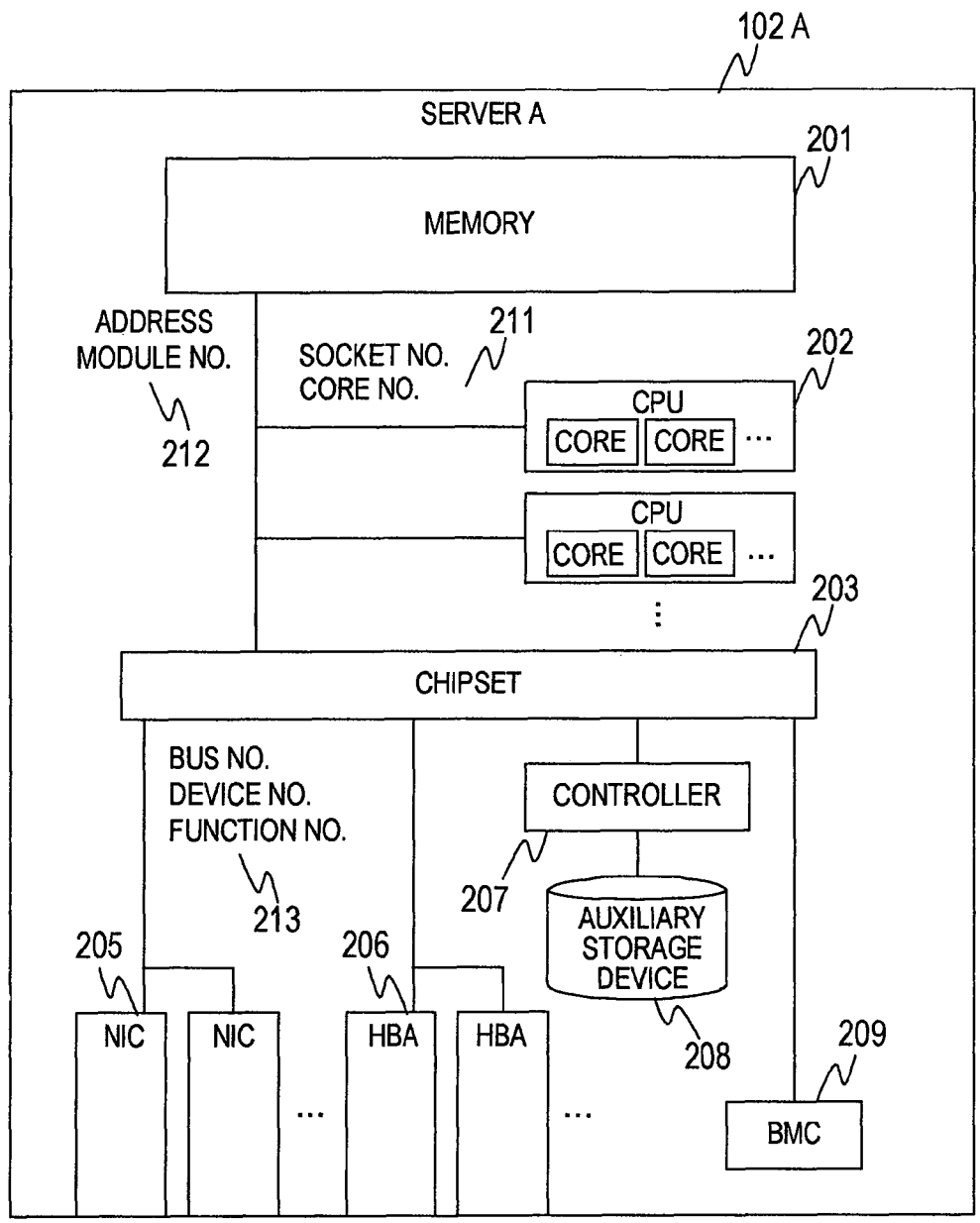
FIG. 2 is a block diagram showing the configuration of the server of the first embodiment.

FIG. 2 is a block diagram showing in detail the configuration of the server of the first embodiment. The server 102A is described here however the same structure may be utilized for the other servers 102B to 102C.

The server 102A comprises a memory 201 for storing the data and the program, one or more processor (CPU) 202 for executing the programs stored on the memory 201, a chipset 203 for controlling buses between devices, an I/O device such as a NIC (Network Interface Card) 205 and a HBA (Host Bus Adaptor) 206, an auxiliary storage device 208, a controller 207 for an auxiliary storage device 208, and a BMC (Baseboard Management Controller) 209, etc. The server 102A need not always comprise all the structural elements shown in the figure.

A processor 202 comprises one or more cores and mounts in a socket. A thread may be present in each core of the processor 202. The HBA 206 communicated with the external disk device by utilizing a protocol such as a fiber channel, SCSI or iSCSI, etc. The BMC 209 mainly monitors the server 102A hardware operating status, and regulates the hardware operation. The BMC 209 for example, externally controls the on or off switching of the server 102A power supply, detects faults in the server 102A, and notifies an external section of the fault that was detected.

An identifier for identifying each structural element is attached to each structural element of the server 102A. More specifically, in the example in the figure, socket No. and core No. (211) serve as the identifier for identifying the processor and the core; address and module No. (212) serve as the identifier for identifying memory; and bus No, device No. and function No. (213) serve as the identifier for identifying the device (for example, PCI device).

Figure 3:
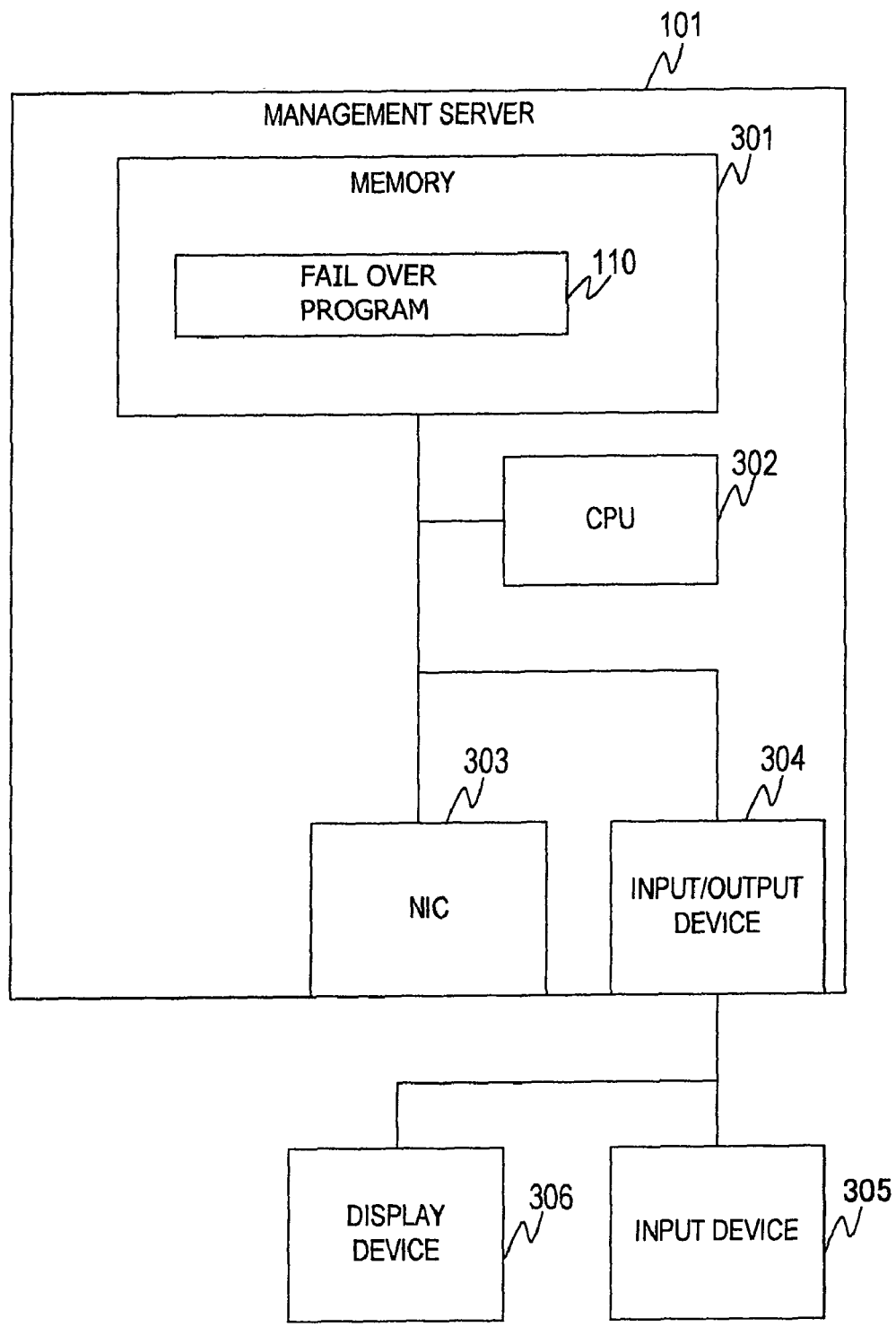
FIG. 3 is a block diagram showing the configuration of the management server of the first embodiment.

FIG. 3 is a block diagram showing the detailed configuration of the management server 101 of the first embodiment.

The management server 101 comprises a memory 301 for storing the fail over program 110, one or more processor (CPU) 302 for executing programs stored in the memory 301, and an input/output device 304 for inputting and outputting information to the management server 101 and the NIC303 connecting to the management server NW-SW105.

The input/output device 304 is connected to an input device such as a mouse or keyboard; and to display device such as a display. The input/output device 304 moreover may connect to a storage device such as a USB media, or an external storage device, etc. The management server 101 may load data stored in a storage device by way of the input/output device 304.

The management server 101 may comprises an auxiliary storage device such as a hard disk.

Figure 4:
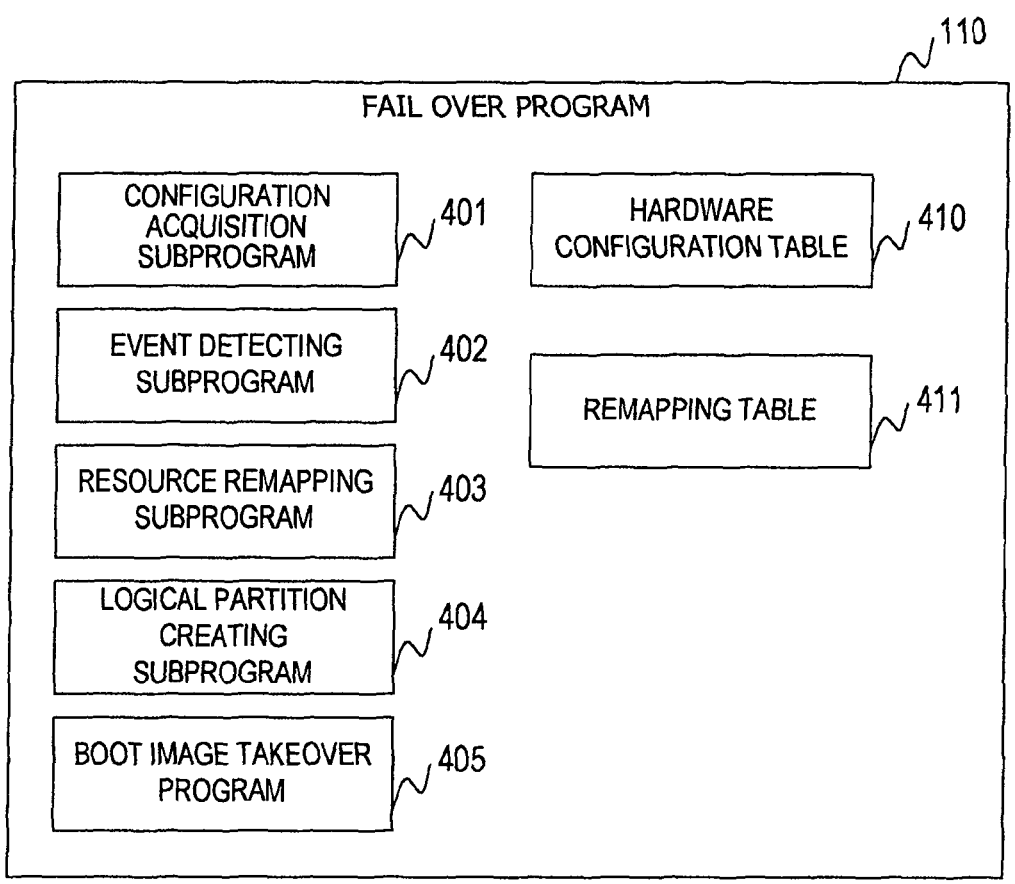
FIG. 4 shows the structure of the fail over program of the first embodiment.

FIG. 4 shows in detail, the structure of the fail over program 110 of the first embodiment.

The fail over program 110 includes a configuration acquisition program 401, an event detecting subprogram 402, a resource remapping subprogram 403, a logical partition creating subprogram 404, a boot image takeover subprogram 405, a hardware configuration table 410, and a resource remapping table 411. The hardware configuration table 410 and the resource remapping table 411 may be configured separately from the fail over program 110. The subprograms and the tables are described in detail later on.

FIG. 5 shows in detail, the structure of the hardware configuration table 410 of the first embodiment.

The hardware configuration table 410 includes a server identifier field (column 501), an application field (column 502), a processor configuration field (column 503), a memory configuration (column 504) and a device configuration (column 505), that shows the hardware configuration of each server 102.

The server identifier field 501 stores the identifier for each server.

Server applications specified by the column 501 are stored in the application field 502. More specifically, "Current" is recorded in the application field 502 when the server performing tasks is the active server. Also, when a fault has occurred in the active server a "Spare" is recorded for the backup server serving as the substitute in order to restore/recover tasks performed by the active server. The different server states can be recorded in other cases, such as when the backup server has already been substituted, or the backup server cannot be utilized for some reason.

The processor configuration field 503 stores the processor configuration and applicable processor identifier for the server specified by the column 501. Information in the processor configuration field 503 is recorded for example in the format: "<socket No.>: <CPU name> <core No.>". More specifically, if the socket No. is 0, the CPU name is "IX306", and the core No. is 0, then "0:IX306 0" is recorded in the configuration field 503.

The memory configuration 504 stores the memory configuration and the applicable memory identifier of the server specified by the column 501. This information is for example recorded in the format "<module No.>:address range" in the memory configuration 504.

The device configuration 505 stores the applicable device identifier and the configuration of the device of the server specified by the column 501. This information is for example recorded in the format "<bus No.>:<device No.>: <device name> <function No.> (<unique ID>) in the disk configuration 505. If there are multiple device with different function Nos. yet the device names, device No. and bus No. are the same, then these are added by grouping them with a "/". More specifically, if the bus No. is 0, the device No. is 0, the device name is "NIC", the function No. is 0, and the unique ID is "MAC1", then a "0:0:NIC 0 (MAC1)" is recorded in the device configuration 505.

The hardware configurations recorded in this table may be added, or deleted as necessary.

FIG. 6 shows in detail the structure of the resource remapping table 411 of the first embodiment. FIG. 6 shows an example of a remapping table for the active server with the identifier "S1" shown in FIG. 5.

The resource remapping table 411 includes a hardware field (column 601), an active server field (column 602) and a backup server field (column 603 and column 604); and shows the corresponding relation between the hardware structural elements of the active server for the computer system, and the hardware structural elements for the backup server. The resource remapping tables 411 are formed to match the number of active servers of the computer system.

The hardware field 601 indicates the type of server hardware and for example shows the processor mounted in the server, and the memory and the device (NIC, HBA, etc.).

The active server field 602, the backup server field 603 and the backup server field 604 respectively show the hardware structural elements mounted in the server specified the by server identifiers "S1", "S5" and "S6".

The resource remapping table 411 retains the hardware structural elements by utilizing the same identifier as the hardware structural table 410 (refer to FIG. 5). The hardware structural elements recorded on the same line (record) of the remapping table respectively correspond to each other, and are utilized when replacing the server. The example in this figure, shows the relation of the device "1:0:HBA 0" for server identifier "S1" to the "2:0:HBA 0" for the device of server identifier "S5" and "1:0:HBA 1" for the device of server identifier "S6". Also, the hardware structural elements established in column 602, 603 and 604, are grouped into the different hardware types of column 601 but a column 601 need not be established if there is no need for grouping the hardware.

If identical hardware elements are jointly shared hardware, then information showing that the hardware is shared hardware is added to the table. In the example in the figure, "(share)" is added and retained to the shared hardware. If the backup server does not comprise any corresponding hardware structural elements, then the information ("Not exist" etc.) showing there are no corresponding hardware structural elements is added and retained in the table.

When in a state where hardware structural elements on the backup server are already in use (for example, a state where utilized on the logical partition, etc.), then information "(In use)" showing that the applicable hardware elements are in use is added to the table and held there If providing an emulation function for the hardware structural elements in the backup server, then information showing the emulation is possible may for example be added as "(emu)" in the hardware structural elements. The emulation function here is a function to change the active server processor commands with the backup server, when the active server and the backup server possess different processor architecture.

The resource remapping table 411 need not always retain the corresponding relation between all required hardware structural elements mounted in the server.

Figure 7:
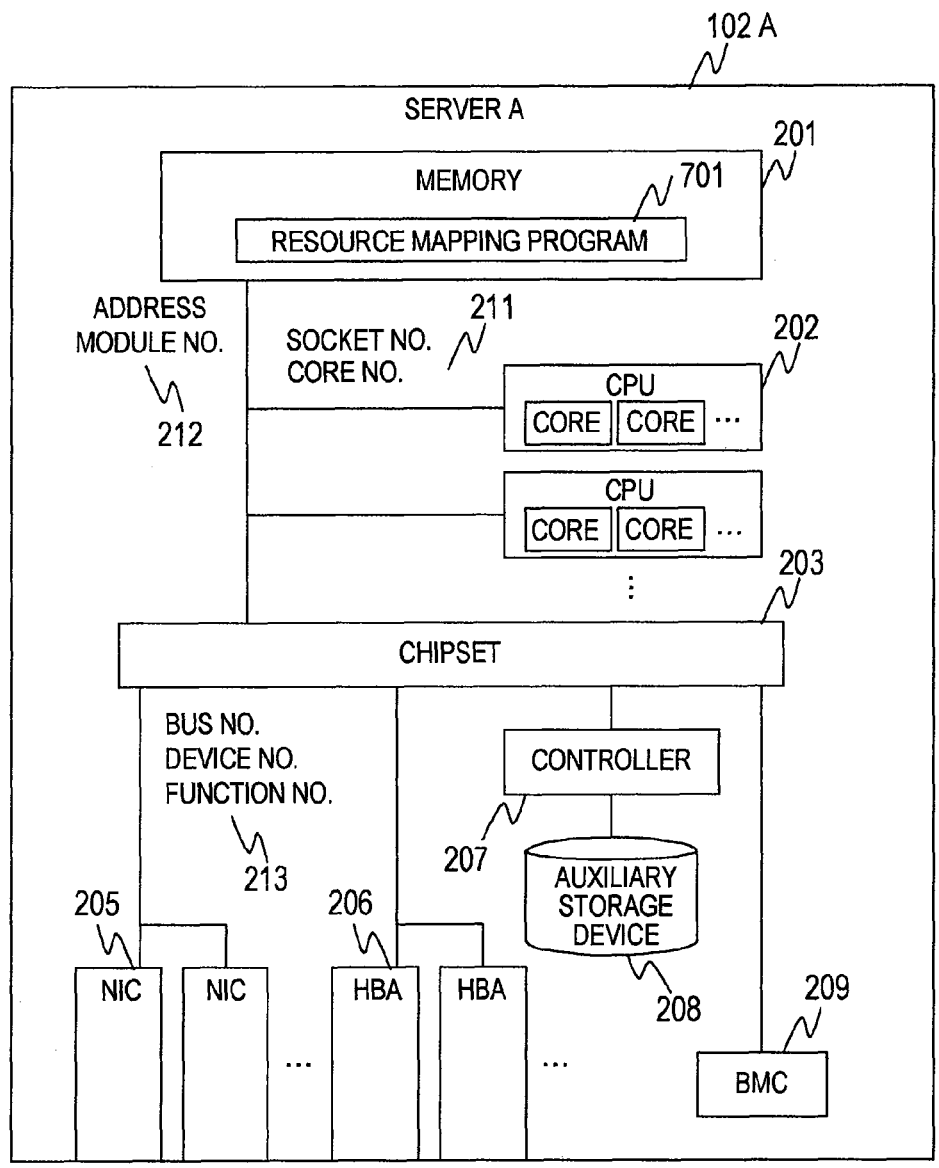
FIG. 7 is a block diagram showing the state when the resource mapping program of the first embodiment is being executed on the server.

FIG. 7 is a block diagram showing the state when the resource mapping program 701 of the first embodiment is being executed on the server 102A. The description for the server 102A is the same as FIG. 2 however the description also applies to the other servers 102B-C.

The memory 201 stores the resource mapping program 701. The processor 202 executes the resource mapping program 701.

The resource mapping program 701 includes a function for mapping a portion or all hardware structural elements such as processor 202, memory 201, NIC 205, HBA 206 included in the server 102A onto the logical partitions. A virtual server can in this way be installed on the server 102A.

One or multiple logical partitions may be created. Moreover, one hardware structural element may be shared among multiple logical partitions. One processor core for example may be jointly shared among multiple logical partitions by time-sharing. One structural hardware element may occupy each logical partition. One or more logical partitions may in this way be created on one server, and the operating system may be executed on each separate logical partition.

The resource mapping program 701 may convert the identifiers for each hardware structural element. In this way, identifiers for each hardware structural element recognized by software such as operating system performed on the logical partitions can be converted to an optional desired identifier.

The resource mapping program 701 can be mounted as hardware or in other words added as hardware structural elements for the server 102A. The resource mapping program 701 may for example be mounted in the chipset 203 as one function of the chipset 203.

The resource mapping program 701 may be executed by switches on a controller rather than executed by a server. The resource mapping program 701 may for example be executed by a switch such as an Infiniband switch.

Figure 8:
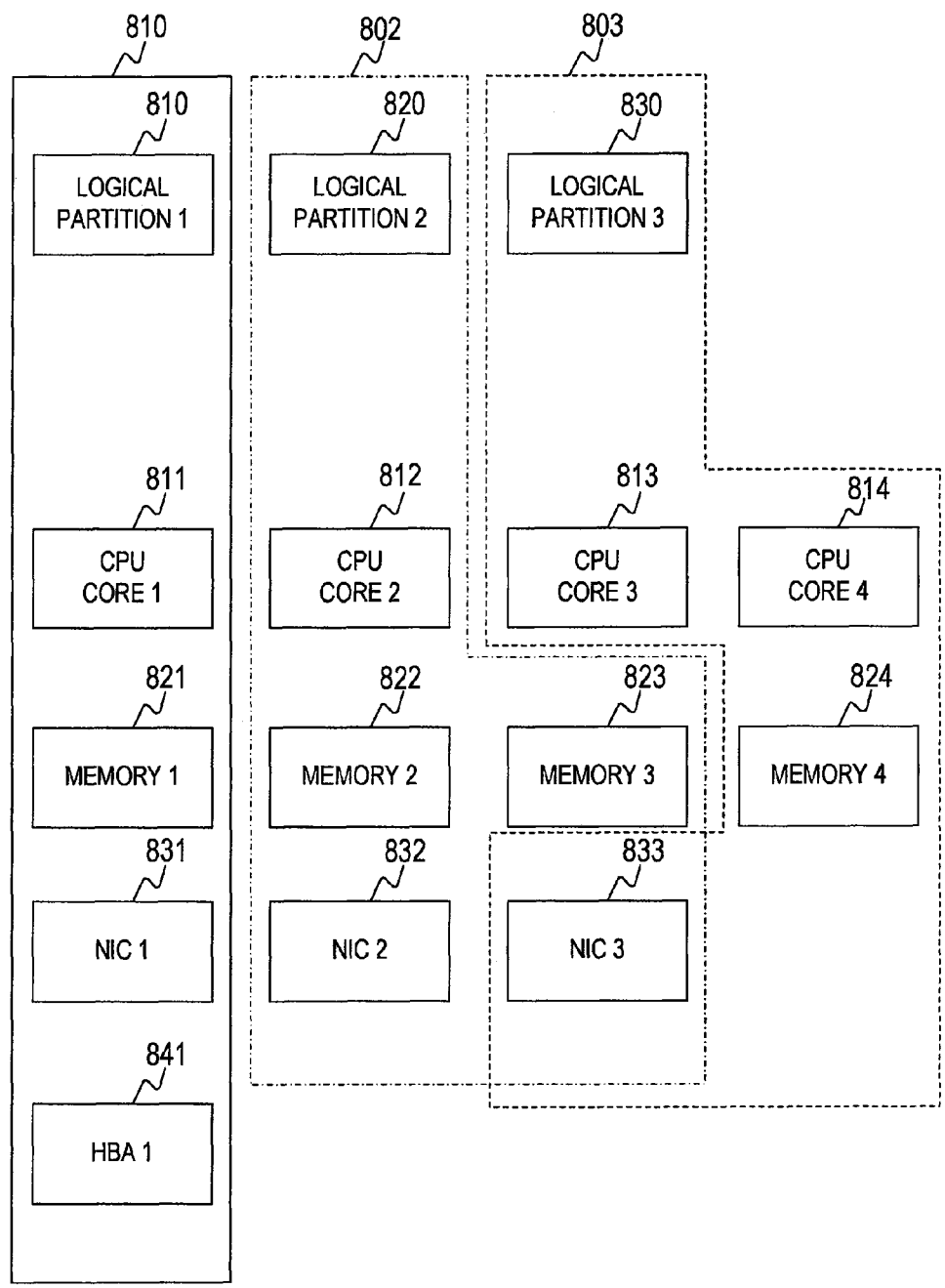
FIG. 8 is a drawing for showing the principle of the resource mapping program of the first embodiment assigning logical partitions of hardware structural elements.

FIG. 8 is a drawing for showing the principle of the resource mapping program 701 of the first embodiment of this invention assigning logical partitions to hardware structural elements.

The logical partition 1 (810) is hardware included in the group 801. The processor core 1 (811), the memory 1 (821), the NIC1 (831) and the HBA 1 (841) are assigned to the group 801. The group 802 and the group 803 respectively show the assignment of hardware structural elements to the logical partitions 820 and 830.

The group 802 and the group 803 both mutually include the NIC3 (833). This figure shows that the logical partition 820 and 830 both share the NIC3 (833).

Those hardware structural elements belonging to just a single group, are occupied by the logical partitions in that group.

Figure 9:
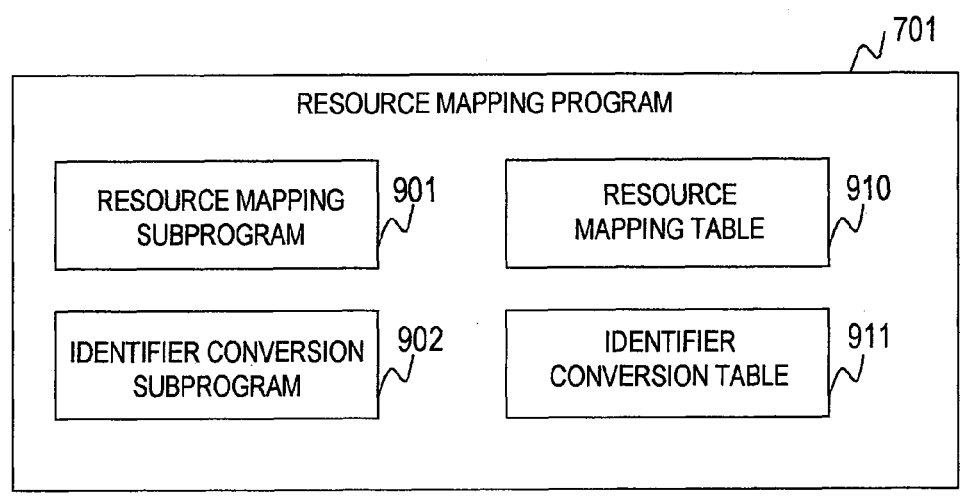
FIG. 9 shows the structure of the resource mapping program of the first embodiment.

FIG. 9 shows the structure of the resource mapping program 701 of the first embodiment of this invention.

The resource mapping program 701 includes a resource mapping subprogram 901, an identifier conversion subprogram 902, a resource mapping table 910 and an identifier conversion table 911. The resource mapping table 910 and an identifier conversion table 911 may be formed separately from the resource mapping program 701. Details of the subprograms and the tables are described later on.

FIG. 10 shows the structure of the resource mapping table 910 of the first embodiment of this invention.

The resource mapping table 910 includes a logical partition identifier field (column 1001), a hardware field (column 1002), and a mapping field (column 1003). Identifiers for each hardware structural element assigned to the logical partitions are shown.

The logical partition identifier field 1001 holds the logical partition identifiers. The hardware field 1002 holds the hardware types. The mapping field 1003 holds identifiers for the hardware structural elements assigned to logical partitions specified by the column 1001.

The resource mapping table 910 holds hardware structural elements utilizing the same identifiers as the hardware structural table 410 (refer to FIG. 5). The mapping field 1003 is grouped into hardware types established by the hardware field 1002. If grouping of these types is not required then the column 1002 need not be provided.

When the hardware structural elements assigned to logical partitions is hardware shared among multiple logical partitions, then information (for example "share") showing it as shared hardware is added and held in the table. This table need not always retain all hardware structural elements assigned to the logical partitions.

FIG. 11 shows the structure of the identifier conversion table 911 of the first embodiment of this invention.

The identifier conversion table 911 includes a logical partition identifier field (column 1101), a hardware field (column 1102), an identifier field (column 1103) and a post-conversion identifier field (column 1104).

The logical partition identifier field 1101 holds identifiers for the logical partitions. The hardware field 1102 holds the hardware types.

The identifier field 1103 holds identifiers for hardware structural elements assigned to logical partitions specified by the column 1101, by utilizing the same identifier as the resource mapping table 910 (refer to FIG. 10). Identifiers held in the identifier field 1103 are identifiers for hardware (actual hardware) structural elements physically mounted in a server capable of being recognized from the resource mapping program 701.

The post-conversion identifier field 1104 holds identifiers after conversion from hardware structural element identifiers specified by the identifier field 1103. Identifiers held in the post-conversion identifier field 1104 are hardware structural element identifiers in logical partitions recognized from software such as operating system executed on the logical partitions.

Identifiers held in the column 1103 and the column 1104 are grouped into hardware types corresponding to the column 1102. However, the column 1102 need not be provided and the identifiers grouped into hardware types unless necessary.

The example in this figure shows the identifier for the actual hardware "2:0:HBA 0" assigned to the logical partition "L1", is converted to "1:0:HBA 0" serving as an identifier in the logical partition.

When there are unique ID in the hardware structural elements, these unique ID in the hardware structural element on the logical partition can be converted as seen from software such as the operating system executed on the logical partition. Therefore when there is a unique ID in the hardware structural elements, a unique ID is added to the hardware in the applicable item for column 1103 and column 1104. In the example in this figure, the "MAC7" listed under the identifier is the unique ID for the hardware, and is converted to "MAC1" as the unique ID on the logical partition. However the information for the unique ID need not be added to the items if there is no need for converting the unique ID.

This table need not always include the corresponding relation of all hardware structural elements assigned to logical partitions.

Figure 12:
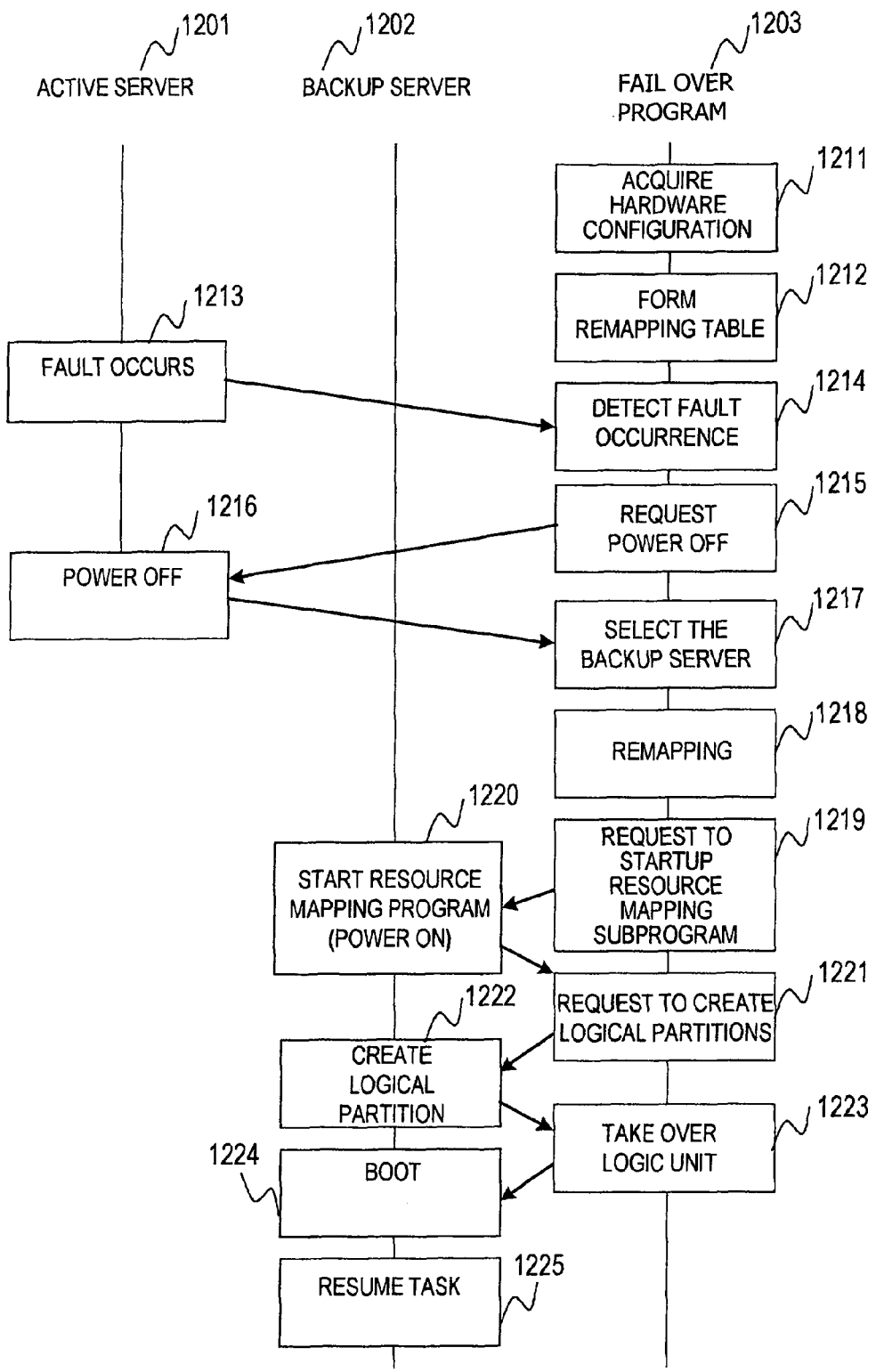
FIG. 12 is a sequence diagram showing the overall server takeover operation of the first embodiment.

FIG. 12 is a sequence diagram showing the overall server takeover operation of the first embodiment of this invention. The active server 1201, the backup server 1202, and the fail over program 1203 (management server 101) execute the processing for the sequence shown in the figure.

In step 1211, the fail over program 1203 acquires the hardware structural information on the computer system and forms the remapping table in step 1212.

Next, in step 1213, when a fault occurs in the active server 1201, the fail over program detects a fault or problem in the active server 1201 in step 1214, and starts the fail over sequence from step 1215 onward. Aside from when a fault has occurred in the active server 1201, this fail over sequence may also be executed by instructions for example from the operator. A request to turn the active server 1201 power off is made in step 1215.

The active server 1201 cuts off the power when a power off request is made from the fail over program 1203 in step 1216. However shutdown processing, a shift to standby mode, or a shift to hibernation mode may be made rather than shutting off the power.

When the fail over program 1203 completes power off of the active server 1201 (step 1216), the fail over program 120 next decides the backup server 1202 to serve as the replacement. The backup server 1202 to serve as the replacement was selected after turning off the active server 1201 power, however the backup server 1202 serving as the replacement may be selected before turning off power to the active server 1201. In this case, the turning off of power to the active server 1201 may be completed prior to starting the logical partitions (step 1224). A check can therefore be made of whether the power to the active server 1201 power is off or not before starting the logical partitions (step 1224).

Afterwards, in step 1218, the program then performs remapping of the active server 1201 and the backup server 1202 hardware, and decides the configuration of the logical partitions created in the backup server 1202. Then, in step 1219, startup of the resource mapping program 701 is requested to the backup server 1202.

In step 1220, the backup server 1202 power is turned on and the resource mapping program 701 is started up on the backup server 1202. However this step 1220 may be skipped if the backup server 1202 is already operating and the resource mapping program 701 is already being executed. When finished starting up the resource mapping program 701 (step 1220), the fail over program 1203 in step 1221 requests the resource mapping program 701 to form logical partitions on the backup server 1202 based on the logical partition configuration decided in step 1218.

In step 1222, the resource mapping program 701 of the backup server 1202 receives the request to create logical partitions and forms those logical partitions.

After creating the logical partitions (step 1222), in step 1223, the fail over program 1203 takes over to assume the logic unit 131 used by the current server 120 in the logical partitions on the backup server 1202 and requests to boot the logical partitions for the resource mapping program of the backup server 1202. However the booting may be performed manually later on without requesting to boot the logical partitions here.

In step 1224, the resource mapping program receives the request to boot the logical partitions on the backup server 1202, and starts (boots) the logical partitions based on the boot image stored in the logic unit 131 that was taken over for the logical partitions. The tasks performed by the active server 1201 are therefore taken over in step 1215 on the logical partitions of the backup server 1202.

The sequence shown in FIG. 12 is described next in further detail.

Figure 13:
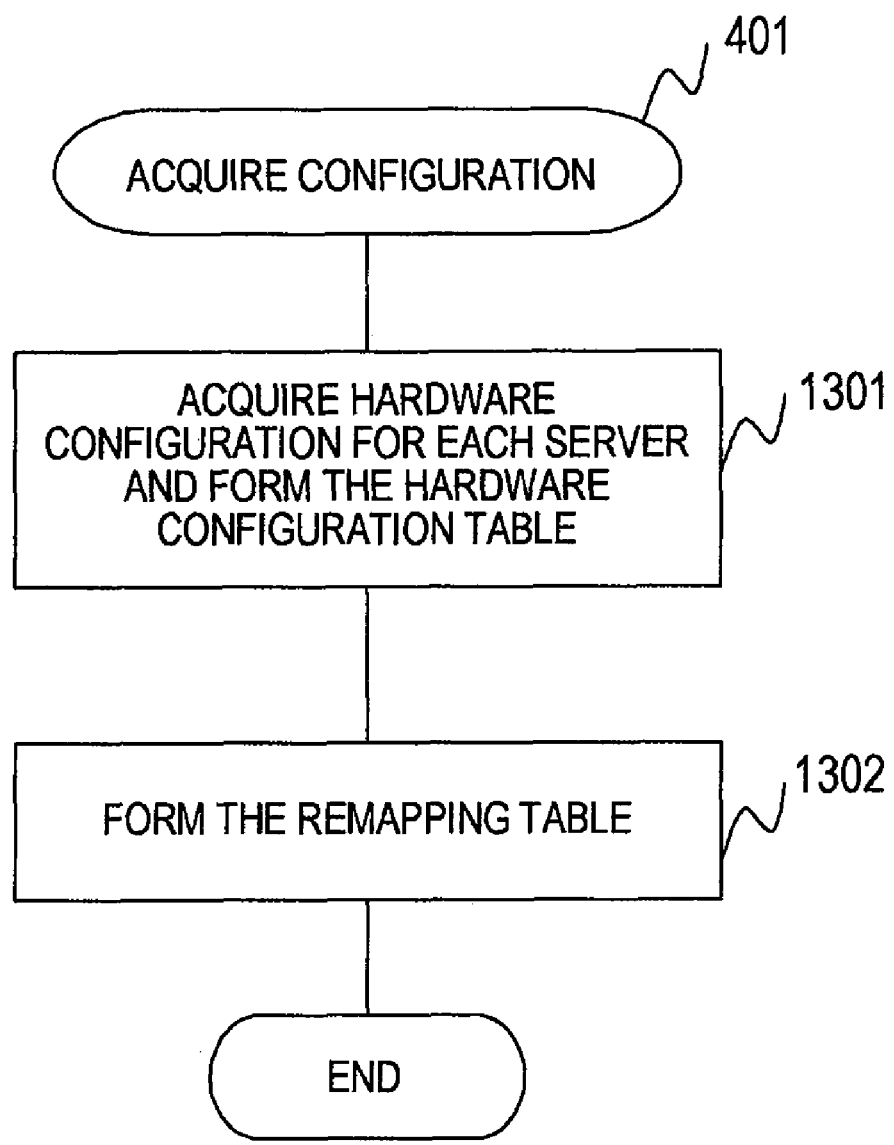
FIG. 13 is a flow chart showing the processing by the configuration acquisition subprogram of the first embodiment.

FIG. 13 is a flow chart showing the processing by the configuration acquisition subprogram 401 in the fail over program 110 of the first embodiment of this invention. This flowchart corresponds to step 1211 through step 1212.

In step 1301, the hardware configuration information for each server in the computer system is acquired and the hardware configuration table 401 formed based on that acquired information. The hardware configuration information for the servers may be acquired over a network, or acquired as files from a disk, etc., or acquired by running hardware configuration information acquisition program for each server, or acquired by the user operating using a GUI with the fail over program 110. This acquired hardware configuration information for example is information included in the hardware configuration table 410 (refer to FIG. 5).

The resource remapping table 411 is formed next in step 1302. The resource remapping table 411 may be acquired over a network, or acquired as files from a disk, etc., or acquired from hardware configuration information obtained by running a hardware configuration information acquisition program for each server, or acquired by the user operating a GUI with the fail over program 110.

The resource remapping table 411 may be automatically formed in whole or in part if the corresponding relation between hardware structural elements on the backup server and the active server match each other, by referring to the hardware configuration table 410, etc. This resource remapping table 411 can be formed for example if the active server and the backup server possess identical hardware structures, or the hardware structure of the server can be specified for example from the model number of each server or the serial number, or when the corresponding relation of the hardware structural elements between the servers was decided in advance.

The hardware structural elements to be acquired or input here, is information included for example in the hardware configuration table 410 (refer to FIG. 6). A remapping rule table for defining the rules for the corresponding relation among hardware structural elements between servers can be formed in the fail over program 110. Rules such as "Make a portion of the backup server processor a shared processor when the number of backup server processor is less than the number in the active server" or "Devices with a bus number 0 on the active server, shall be devices with a bus number 1 on the backup server" can be registered in the remapping rule table as desired.

When forming the resource remapping table 411 in step 1302, the corresponding relation among hardware structural elements between servers can be automatically selected based on this remapping rule table to allow automatically forming a portion of or an entire of the resource remapping table 411. The rules registered in the remapping table may for example be acquired over a network, or acquired from a file such as a disk, or acquired by user operation using a GUI on the fail over program 110.

Figure 14:
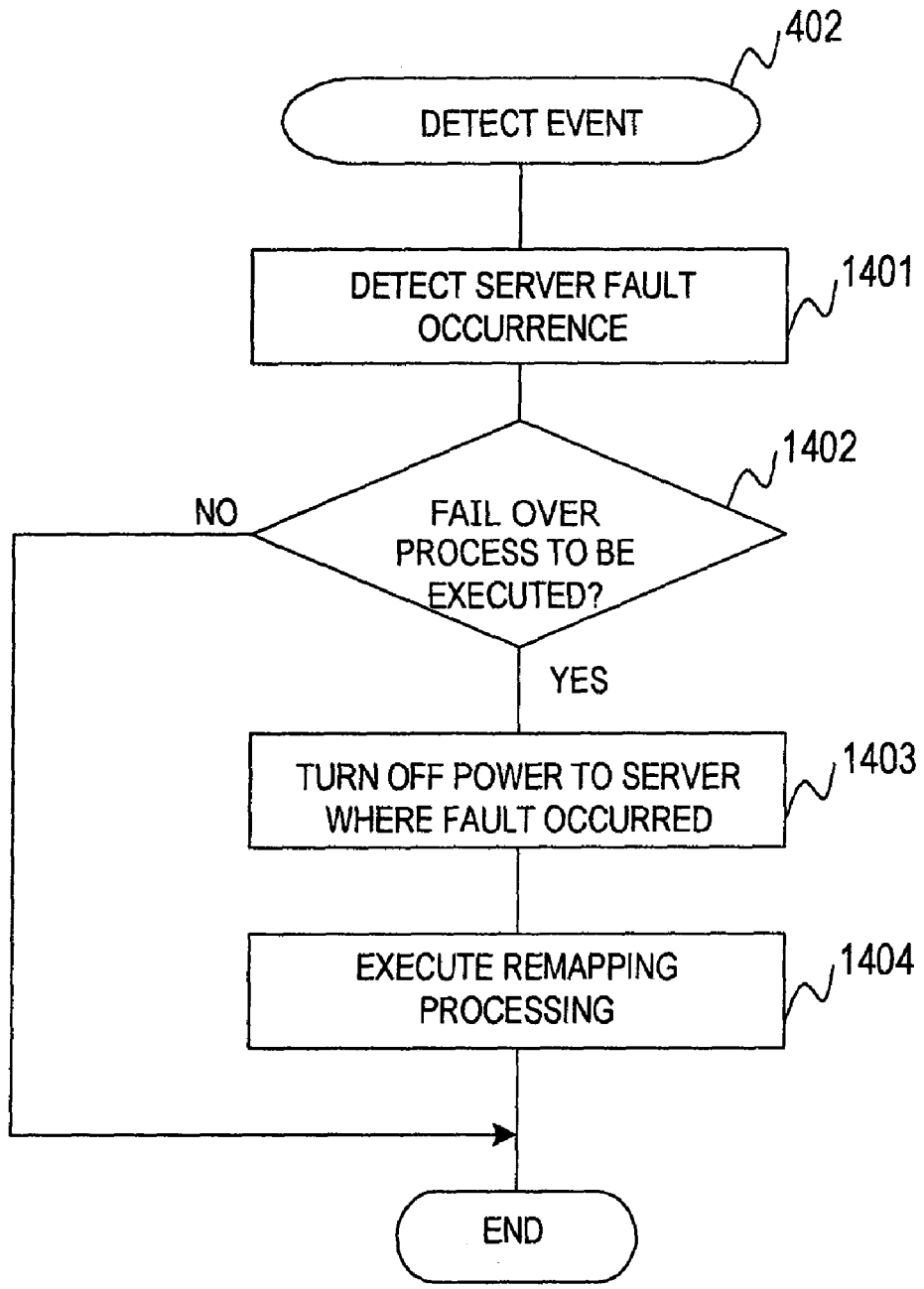
FIG. 14 is a flow chart showing the processing by the event detecting subprogram of the first embodiment.

FIG. 14 is a flow chart showing the processing by the event detecting subprogram 402 of the fail over program 110 of the first embodiment of this invention. This flow chart corresponds to the steps 1214 through 1215 in FIG. 12.

Step 1401 detects a fault occurring in the server. Notification of the fault may be received from a BMC in the server and/or may be found by notification from a fault sensing program executed on the server. The fail over processing may also be executed when some kind of fault has occurred among any of the devices making up the computer system, rather than just the server. Moreover, the event need not only be a fault that occurred but may for example be the user operating a GUI on the fail over program 110 to request a command to replace the active server with a backup server.

In step 1402, a decision is made on whether or not to execute the fail over processing. This fail over processing here is the process to substitute the active server with the backup server as shown from step 1214 onward in FIG. 12. In step 1402 when continuing to execute the operating system or application on the active server is impossible due to effects from the fault, then a decision is made to execute the fail over process and the operation goes to step 1403. However when the decision is not to perform the fail over processing then the event detecting program is terminated. The case where fail over processing is not performed is when estimated that the fault cannot recovered from, or where recovery is likely without any processing since the fault is temporary.

When the user has input a request to the fail over program 110 to substitute the active server with the backup server, the process switches unconditionally to step 1403. The user may also set the decision conditions as desired without being restricted to the above conditions.

A request is made to turn off the power in the active server where a fault occurred in step 1403, and after power is turned off the process proceeds to step 1404. Here the power to the active server may be turned off by using Wake On Lan function in the NIC, or making a request to a controller (for example BMC, etc.) capable of controlling the servo power from outside the server. A request to turn off the power can also be made to a power control program executed on the active server. The request can also be made for server shutdown, hibernation, or standby rather than just turning the power off.

If operating multiple logical partitions on the active server, then a request must first of all be made to the resource mapping program 701 to stop all logical partition being executed on the active server, and after stopping all logical partitions, the power to the active server may be turned off. A request can be made for server shutdown, hibernation, or standby rather than just turning the power off.

In step 1404, the operation goes to processing by the resource remapping subprogram 403. The going to processing by the resource remapping subprogram 403, may be made after turning off power to the active server 1201, or may be made before turning off power to the active server 1201. If the going to processing by the resource remapping subprogram 403 was made before turning off power to the active server 1201, then the power to the active server 1201 may be turned off up to the request (step 1702) to start the logical partitions.

Figure 15:
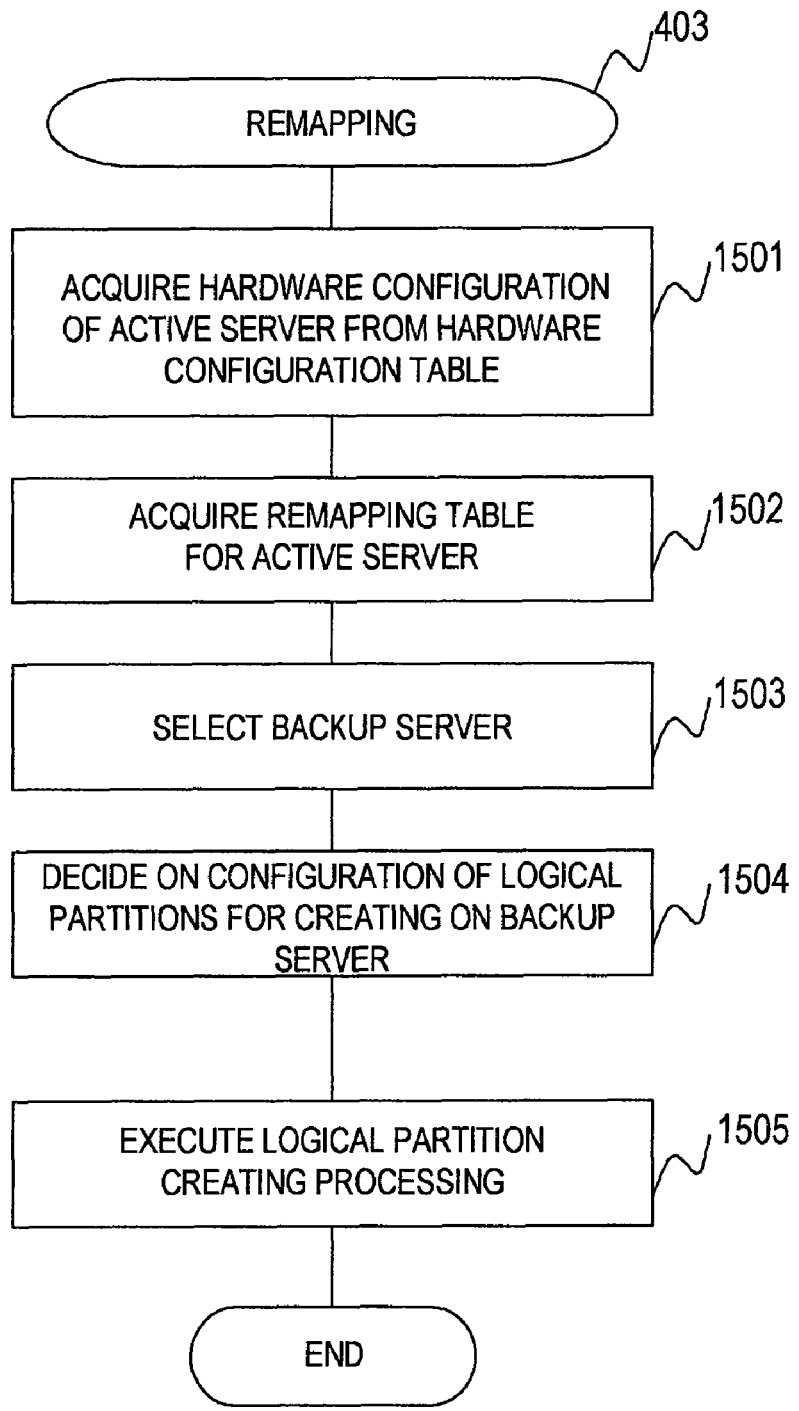
FIG. 15 is a flow chart showing the processing by the remapping subprogram of the first embodiment.

FIG. 15 is a flow chart showing the processing by the resource remapping subprogram 403 in the fail over program 110 of the first embodiment of this invention. This process corresponds to steps 1217 through 1218 in FIG. 12.

The program searches the hardware configuration table 410 in step 1501, and acquires the hardware configuration of the active server. If the multiple logical partitions are operating on the active server then the resource mapping program 701 of the active server acquires the resource mapping table 910 for all the logical partitions.

In step 1502, the program acquires the resource remapping table 411 of the active server.

The backup server to use as the substitute is selected in step 1503. More specifically, the program searches the resource remapping table 411 acquired in step 1502, and searches for a backup server capable of serving as a replacement server.

The backup server capable of serving as a replacement server here is a backup server comprising hardware structural elements corresponding to all the hardware structural elements of the active server as shown in the resource remapping table 411; and moreover is in a state allowing utilization of all the hardware structural elements. The backup server for example, is a server in columns with no information indicating "(Not exist)" or "(In use)" in any of the items among the backup server columns in the resource remapping table 411 shown in FIG. 6.

If there are multiple backup servers capable of being used as replacement servers then priority in the selection is given to backup servers with the most identifiers matching both hardware structural elements on the active server. Next when replaced with that backup server, selection priority is given to backup servers with few shared hardware structural elements. For example, those backup servers with few "(share)" information items among the applicable backup server columns in the resource remapping table 411 are selected. Moreover a backup server may not be used as a substitute if there is no compatibility among the hardware structural elements. However, if the active server hardware structural elements can be emulated on the backup server then that backup server may serve as a replacement.

Even backup servers lacking some hardware structural elements corresponding to those in the active server may serve as replacements. For example if the active server comprises two NIC and these are used redundantly in a teaming function, then a backup server comprising only one NIC may be utilized as a replacement server. In other words, a backup server comprising hardware structural elements other than redundant hardware elements can be selected as a backup server.

Other than the above described conditions, the conditions for selecting the backup server may also be optional conditions set by the user.

In step 1504, the configuration is selected for the logical partitions created on the backup server selected in step 1503. However, this step 1504 may be skipped when the hardware structural elements on the backup server and the active server match each other or when there is no need to form logical partitions on the backup server. Here, the logical partition configuration is the forming of information on the backup server logical partitions in the resource mapping table 910 and the identifier conversion table 911.

Information from the resource remapping table 411 and the hardware structural table 410 relating to the active server and acquired in step 1501 and step 1502 is utilized for forming this information. First of all, the all items for the applicable backup server columns in the resource remapping table 411 are extracted, and the applicable hardware structural elements assigned to the appropriate logical partition in order to form the resource mapping table 910. For example, when replacing the "S1" identifier of the active server into "S5" of the backup server in the resource remapping table 411 shown in FIG. 6, the column 603 corresponding to "S5" is extracted and that information assigned to the hardware structural element assigned to the logical partition "L1", so that a table corresponding to the logical partition "L1" of resource mapping table 910 can be formed as shown in FIG. 10.

When there are logical partitions in the active server, then a resource mapping table 910 for the backup server is made that corresponds to all logical partitions on the active server.

In order to next form the identifier conversion table 911, the backup server column on the resource remapping table 411 is set as the "identifier" column on the identifier conversion table 911; and the column for the active server on the resource remapping table 411 is set as the "Converted" column on the identifier conversion table 911. For example when substituting from the active server "S1" identifier into the "S5" of the backup server in the remapping table 411 shown in FIG. 6, the identifier conversion table 911 shown in FIG. 11 can be formed by extracting the column 603 matching "S5" and the column 602 matching "S1" and then setting these respectively as the "identifier" and the "conversion" in the identifier conversion table 911.

When changing the unique ID of the hardware structural element such as the MAC address, WWN (World Wide Name) and the UUID (Universal Unique Identifier) from the active server to the backup server for the takeover, the hardware configuration table 410 is used to add the unique ID information to the applicable hardware structural information in the identifier conversion table 911 that was made. For example, the MCA address for the NIC of the active server "S1" of the hardware configuration table 410 shown in FIG. 5, is "MAC1", and the MAC address for NIC of the matching backup server "S5" is "MAC7" and therefore a "(MAC1)" is added to the applicable item for column 1104, and a "(MAC7)" to the applicable item in column 1103, in the identifier conversion table 911 of FIG. 11. The unique ID for the NIC of the backup server is in this way converted from "MAC7" to "MAC1".

The unique ID information need not be added if conversion of the unique ID is not required. When forming the identifier conversion table 911 and the resource mapping table 910 for the logical partitions created on the backup server, the process then goes to step 1505.

In step 1505, the process goes to processing by the logical partition forming subprogram 404.

Figure 16:
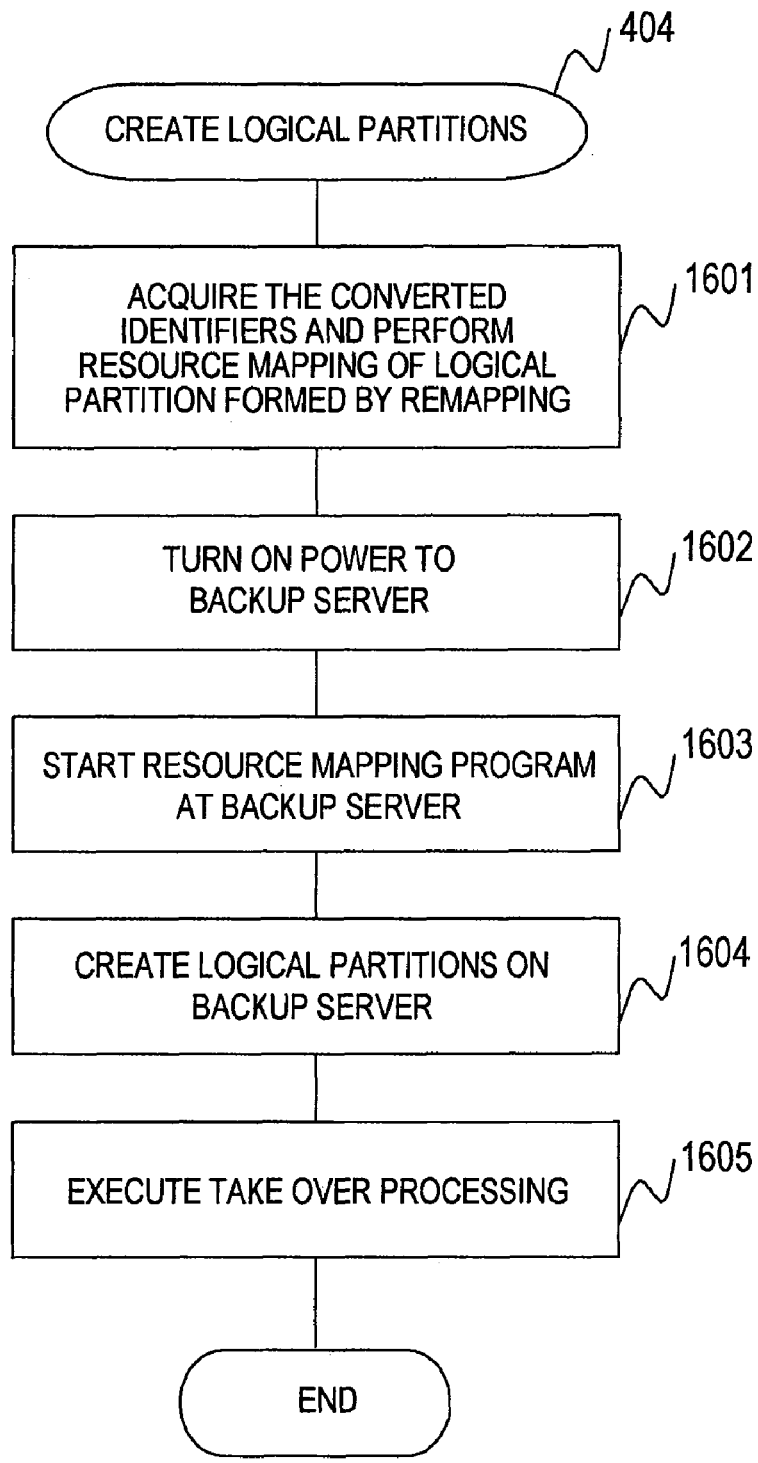
FIG. 16 is a flow chart showing the processing by the logical partition creating subprogram of the first embodiment.

FIG. 16 is a flow chart showing the processing by the logical partition creating subprogram 404 for the fail over program 110 of the first embodiment of this invention. This flow chart corresponds to the steps 1219 through 1222 in FIG. 12.

Information on the resource mapping table 910 and the identifier conversion table 911 for the logical partitions created on the backup server, that were created in processing by the resource remapping subprogram 403 are acquired in step 1601.

Power to the backup server is turned on in step 1602 and the backup server starts. Here, the power to the backup server is turned on by utilizing the Wake On Lan function of the NIC, or a request may be made to a controller (for example, BMC) capable of externally controlling the servo power. Step 1602 may be skipped if the backup server power is already on. When finished turning on power to the backup server, the process goes to the next step.

The resource mapping program 701 starts up for the backup server in step 1603. The fail over program 110 may for example utilize the PXE (Preboot eXecution Environment) boot function of NIC to distribute the resource mapping program 701 over a network, and startup up the resource mapping program 701. Information stored in the auxiliary storage device included in the backup server may be used to start up the backup server. The step 1603 may be skipped if a resource mapping program 701 is assembled beforehand into the backup server, or if the resource mapping program 701 starts up automatically when the backup server power is turned on. The process proceeds to the next step when the resource mapping program 701 starts up.

In step 1604, the program creates the logical partitions on the backup server. In step 1603, the resource mapping program 701 transfers information on the resource mapping table 910 and the identifier conversion table 911 acquired in step 1601 and requests to create logical partitions on the backup server.

When finished creating the logical partitions, "(In use)" information among other information in the resource remapping table 411 showing that the item for the hardware structural element assigned to the created logical partition is currently being used, is added, and the process goes to the next step. Information on items in use need not be added if the hardware structural elements are shared among multiple logical partitions.

In step 1605, operation goes to processing by the boot image takeover subprogram 405. The steps 1601 through step 1604 may be skipped in cases where the hardware structural elements of the active server and the backup server are the same, or when there is no need to form logical partitions on the backup server.

Figure 17:
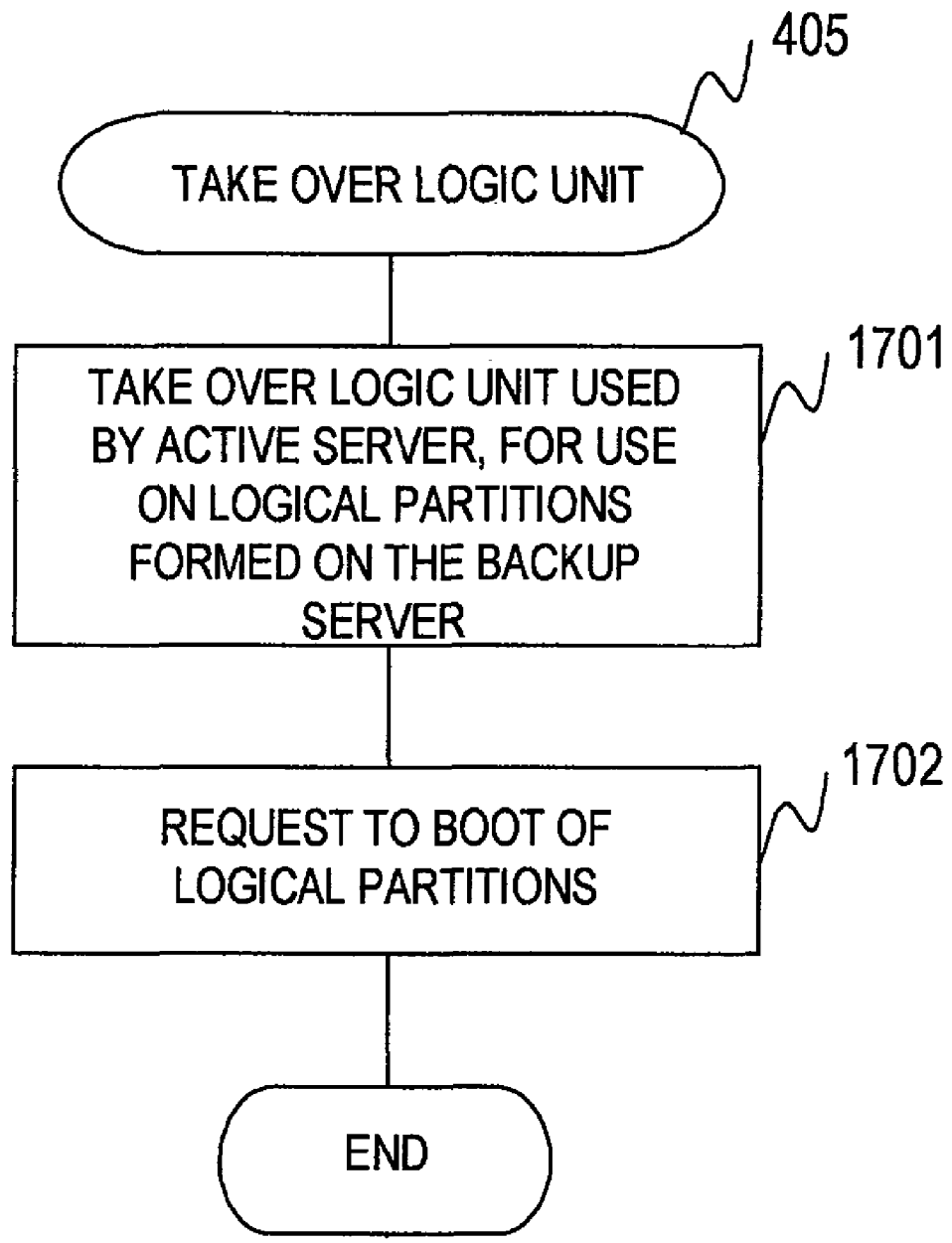
FIG. 17 is a flow chart showing the processing by the boot image takeover subprogram of the first embodiment.

FIG. 17 is a flow chart showing the processing by the boot image takeover subprogram 405 of the fail over program 110 of the first embodiment of this invention. This flow chart corresponds to steps 1223 through step 1224.

In step 1701, the logical partitions of the backup server created by the logical partition creating subprogram 404, take over to assume the active server logical partitions (boot disk). Methods for taking over the logical partitions include a method using the active server to change the security settings on an external disk device to allow accessing the boot disk from the applicable logical partitions on the backup server; or a method for copying a boot image of the active server onto an external disk device capable of being accessed from the backup server logical partitions.

When there are multiple logic units such as one more logical partitions on the active server, then all these logic units are taken over on corresponding backup server logical partitions.

The step 1701 may be skipped when takeover by the logic unit is possible due to taking over to assuming the unique ID of the hardware structural element. This may be skipped in cases where security settings based on the WWN need not be changed because the WWN of the HBA for example was taken over from the active server by the backup server.

The backup server can also take over logic units by the same method, when the logical partition creating subprogram 404 did not form any logical partitions on the backup server. Moreover, if necessary, EFI (Extensible Firmware Interface) and BIOS (Basic Input Output System) on the backup server logical partitions can take over information settings such as for EFI and BIOS from the active server. When finished taking over the logic units, the process proceeds to the next step.

In step 1702, a request is made to the resource mapping program 701 to start the applicable logical partitions. However, if the logical partition creating subprogram 404 did not form logical partitions on the backup server, then a request to turn on the backup server power is made in this step, and the step is terminated after turning on power to the backup server.

Figure 18:
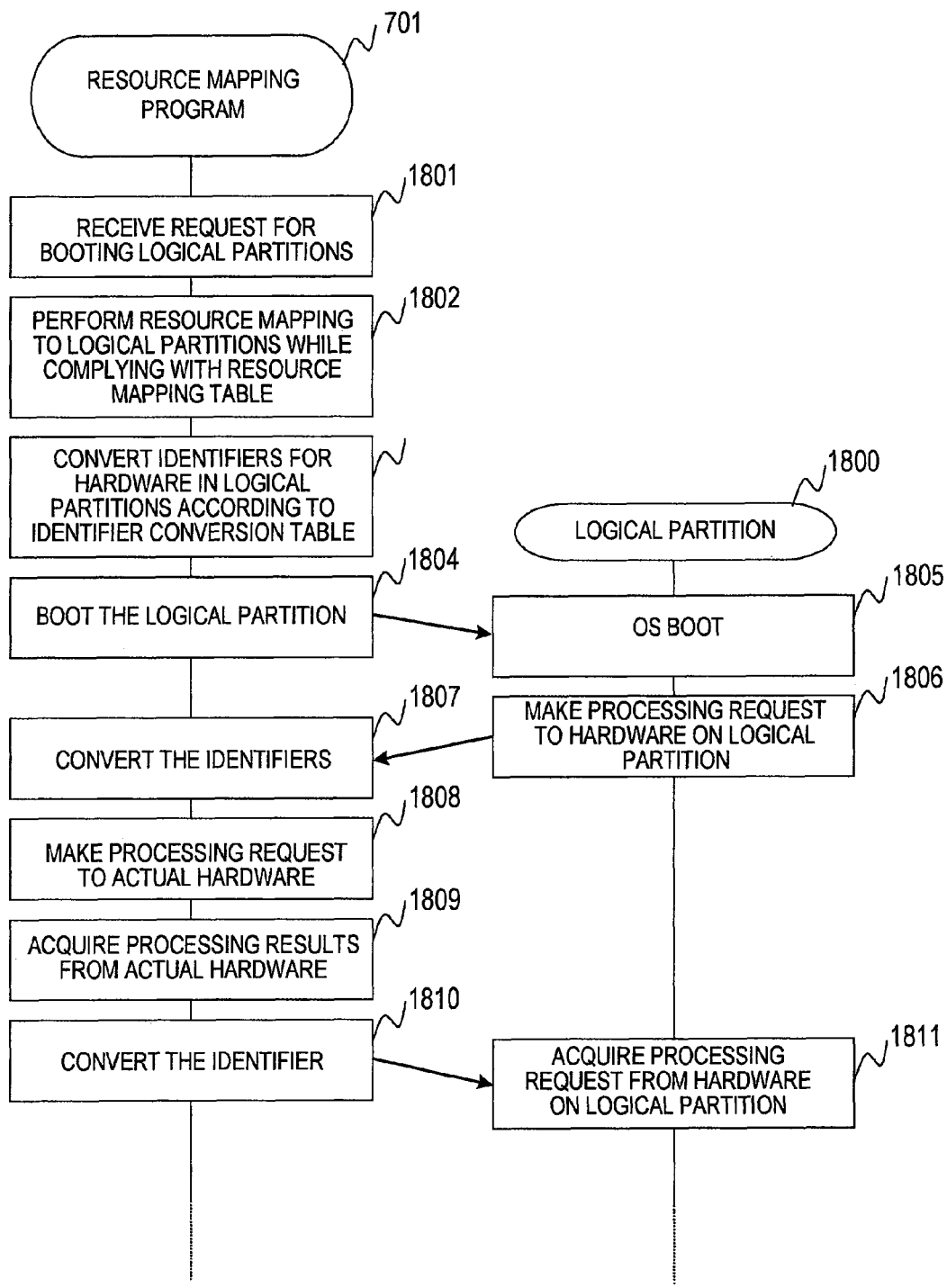
FIG. 18 is a flow chart showing the logical partition boot processing by the resource mapping program of the first embodiment.

FIG. 18 is a flow chart showing the logical partition boot processing by the resource mapping program 701 of the first embodiment of this invention. The flow chart corresponds to step 1225 of FIG. 12. First of all, in step 1801 the program receives the request to boot the logical partition 1800.

In step 1802, the resource mapping program 901 (refer to FIG. 9.) assigns the hardware structural elements to the logical partition 1800 according to the resource mapping table 910.

Based on the resource mapping table 910, the resource mapping subprogram 901 can control handling of just those hardware structural elements assigned to the logical partition 1800 among backup server hardware elements, for software implemented by the logical partition 1800. Moreover, when multiple logical partitions share the hardware structural elements, the resource mapping subprogram 901 can assign the hardware structural elements by time-sharing among the logical partitions, or by recognizing software on the logical partitions as virtual hardware, so that for all intents and purposes, hardware is recognized as if present on the logical partitions.

In step 1803, the identifier conversion subprogram 902 (refer to FIG. 9.) converts the actual hardware identifiers based on the identifier conversion table 911, and recognizes the software logical partitions after conversion as identifiers for hardware structural elements.

In step 1804, the program starts the logical partition 1800. In step 1805, the OS starts up on the logical partition 1800.

Next in step 1806, software such as the OS in the logical partition 1800 sends a processing request to the hardware. Here, the hardware identifier utilized in the processing request is the identifier on the logical partition 1800 that converted in step 1803.

In step 1807, the identifier on the logical partition 1800 for the hardware structural element whose processing request was accepted by the resource mapping program 701 based on the identifier converter table 911, is converted to an identifier of actual hardware. In step 1808, a processing request is sent to the actual hardware, utilizing the identifier converted in step 1807.

Results from the processing request (step 1808) are next obtained in step 1809. In step 1810, an identifier for actual hardware output in the results in step 1809, is converted to a hardware identifier on the logical partition 1800, based on the identifier conversion table 911, and is reported to the logical partition 1800. The identifier for example is reported by an interrupt from the applicable hardware. In this interrupt, the hardware identifier reported to the logical partition 1800, is also the identifier after conversion.

In step 1811, the OS and the software implemented on the logical partition 1800 obtains results from the processing request (step 1806) from the hardware on logical partition 1800.

The processing from this step 1806 up through step 1811 is performed repeatedly during operation of the logical partition 1800. The hardware identifier reported to the logical partition 1800 during this interrupt from the actual hardware is the hardware after conversion.

After substituting an active server with a backup server, yet another active server can be substituted with the same backup server. For example, after replacing an active server "S1" with a backup server "S5" in logical partition "L1", another active server "S2" can be substituted into the logical partition "L2" of the same backup server "S5". The number of backup server units can in this way be reduced by substituting multiple active servers with one backup server unit.

Second Embodiment

The second embodiment of this invention automatically forms a portion or the entire of the resource remapping table 411, using the fail over program 110 of the first embodiment. The scope of the present embodiments of the invention also includes combinations of the second embodiment and the first embodiment.

Figure 19:
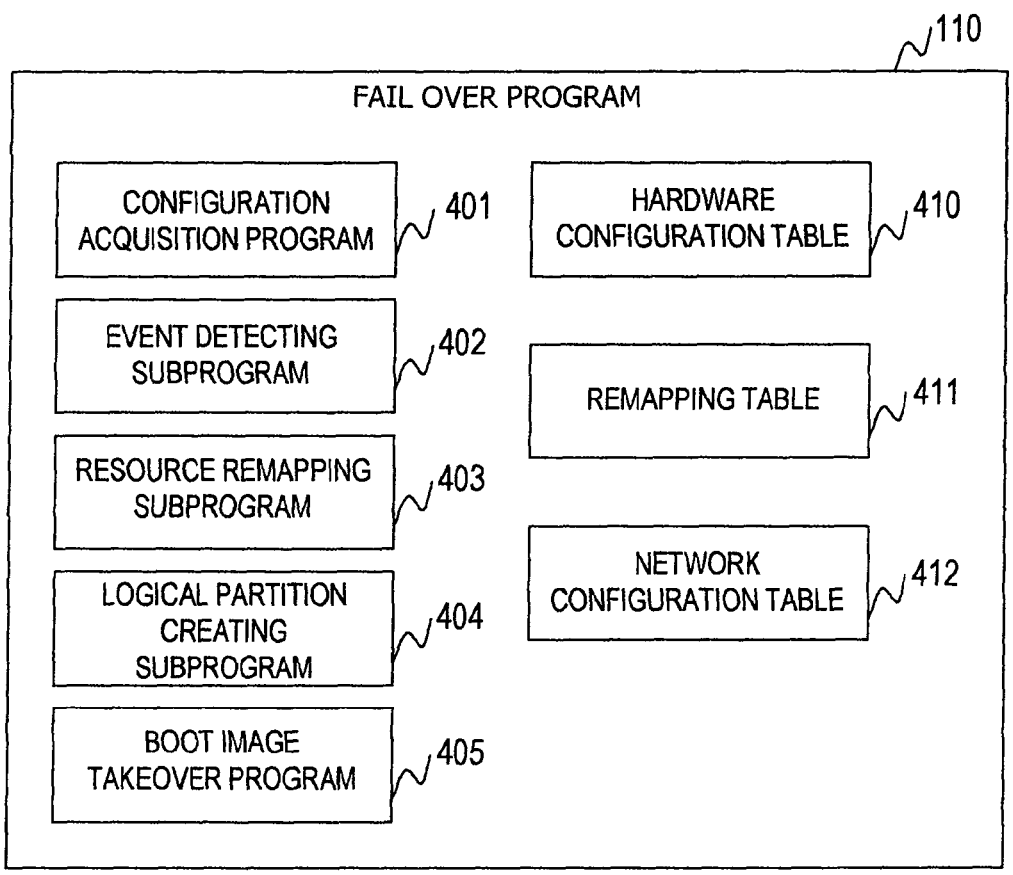
FIG. 19 shows the structure of the fail over program of the second embodiment.

FIG. 19 is a diagram showing the structure of the fail over program 110 of the second embodiment of this invention. The fail over program 110 includes a configuration acquisition program 401, an event detecting subprogram 402, a resource remapping subprogram 403, a logical partition creating subprogram 404, a boot image takeover subprogram 405, a hardware configuration table 410, a resource remapping table 411, and a network configuration table 412.

FIG. 20 shows the network configuration table 412 of the second embodiment of this invention.

The network configuration table 412 includes a server identifier field (column 2001), a network-related hardware field (column 2002) and a connection field (column 2003). In this computer system, the servers are devices connected via a network.

The server identifier field 2001 stores the server identifier.

An identifier for hardware configuration elements relating to the network and included in the server specified in column 2001 is stored in the network-related hardware field 2002. This identifier is the same as the identifier for the hardware structural element stored in the hardware configuration table 410 shown in FIG. 5 for the first embodiment. Network-related hardware for example is hardware connected to the network via a NIC or HBA, etc.

A connection switcher unit connected to hardware specified by column 2002 is shown in the connection field 2003. For example, the NIC "0:0:NIC 0 (MAC1)" of server "S1" is connected to the "NW-SW0" network switch port. The connection switcher unit stored in the connection field 2003 may be a device directly connected by way of a network cable and hardware stored in the network-related hardware field 2002; and may be a device connected along the way via multiple network devices. For example when connected to an external disk device via a network switch then that external disk device may be the connection switcher unit.

Figure 21:
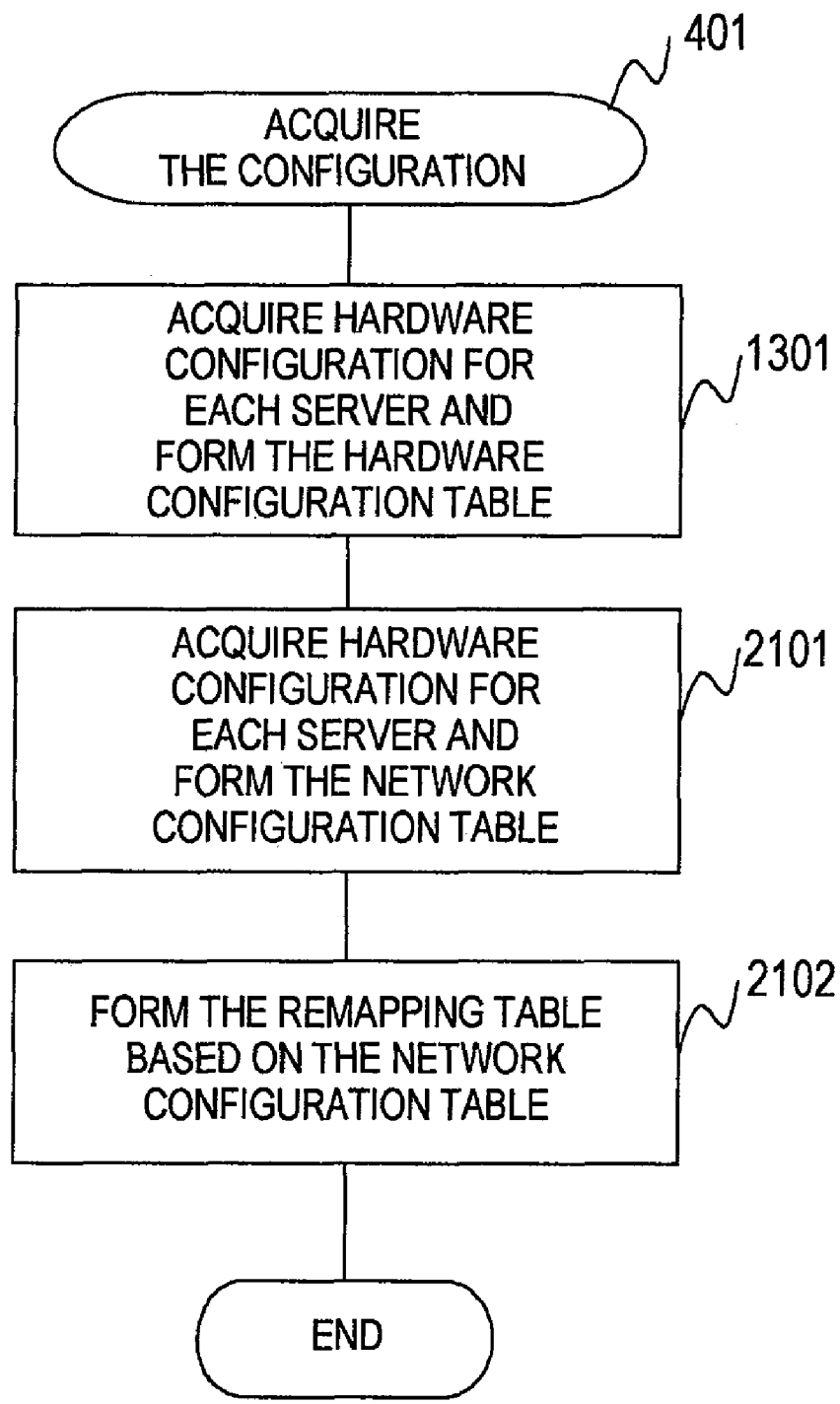
FIG. 21 is a flow chart showing the processing by the configuration acquisition subprogram of the second embodiment.

FIG. 21 is a flow chart showing the processing by the configuration acquisition subprogram 401 of the second embodiment of this invention. The point differing from the first embodiment is that a switch 2101 and a switch 2102 are added and that the step 1302 is eliminated.

Step 2101 acquires the network configuration for each server in the computer system and forms a network configuration table 412. Network configuration information for each server can be acquired via the network, acquired as a file from a disk or other medium, acquired by executing a network configuration acquisition program for each server, acquired from a network switch, or acquired by the user operating a GUI for the fail over program 110. This acquired network configuration information includes for example, information included in the network configuration table 412 (refer to FIG. 20).

In step 2102, the program forms a resource remapping table 411 based on the network configuration table 412 formed in step 2101. Among the network configuration table 412 of the backup servers and the active servers registered in the network configuration table 412, those hardware structural elements connected to the same device are respectively set as corresponding-related hardware structural elements.

In the network configuration table 412 shown in FIG. 20 for example, the network related hardware "1:0:HBA 0 (WWN5)" for server "S3" is connected to the same device "FC-SW1" as the network related hardware "2:0:HBA 1 (WWN10)" for server "S5". Also, the network related hardware "1:0:HBA 1 (WWN6)" for server "S3" is connected to the same device "FC-SW0" as the network related hardware "2:0:HBA 0 (WWN9)" for server "S5". The "1:0:HBA 0" and "2:0:HBA 1" are therefore related (correspond to each other); and the "1:0:HBA 1" and "2:0:HBA 0" are related correspond to each other as shown in the active server field 602 and the backup server field 603 of the S3 on the resource remapping table 411 (FIG. 22).

The resource remapping table 411 can in this way be automatically formed from the network configuration, to lessen the load on the user of having to make entries.

If not all items can be formed in the resource remapping table 411 just by the process in step 2102, then the process in step 1302 shown in FIG. 13 for the first embodiment may be consecutively implemented in addition to step 2102.

While the present invention has been described in detail and pictorially in the accompanying drawings, the present invention is not limited to such detail but covers various obvious modifications and equivalent arrangements, which fall within the purview of the appended claims.

What is claimed is:

1. A takeover method, implemented in a computer system including a management server, one or more first servers performing tasks, and one or more second servers, each of the one or more first servers and the one or more second servers being logically partitioned into one or more logical partitions, for a logical partition on one of the one or more second servers to take over at least one task performed in a logical partition on one of the one or more first servers, the takeover method comprising:

a remapping information acquisition step for acquiring, by the management server, hardware configuration information of hardware included in the one or more first servers and the one or more second servers, and acquiring remapping information showing a relation between the hardware included in the one or more second servers and the hardware included in the one or more first servers and states of structural elements of the hardware;

a second server selecting step for selecting, by the management server, in a case where a logical partition on one of the one or more second servers takes over at least one task performed in a logical partition on one of the one or more first servers, a second server which includes hardware structural elements corresponding to the hardware structural elements of the first server performing the task to be taken over and available to be used from the one or more second servers based on the remapping information and the hardware configuration information of the one or more second servers and the one or more first servers to determine the second server for taking over the task performed in the first server;

a resource mapping information creating step for creating, by the management server, resource mapping information showing identifiers of hardware structural elements to be allocated to the logical partition on the selected second server corresponding to the logical partition on the first server performing the task to be taken over;

a logical partition creating step for creating, by the selected second server which includes a resource mapping program for mapping the hardware structural elements in the selected second server to logical partitions, a logical partition and allocating the hardware structural elements of the selected second server to the created logical partition corresponding to the logical partition on the first server performing the task to be taken over based on the resource mapping information; and a takeover step for taking over, by the management server, the at least one task performed in the logical partition on the first server to the logical partition created on the selected second server.

wherein the resource mapping program includes a function to share the hardware structural elements in the selected second server by a plurality of logical partitions, and wherein, in the logical partition creating step, the selected second server allocates the hardware structural elements to the created logical partition to be shared by other logical partition in the second server, based on the remapping information.

2. The takeover method according to claim 1, wherein the hardware configuration information stores a bus number, a device number, a function number, a world wide name or a media access control address of a device as hardware identifiers of each of the hardware structural elements, wherein, in the logical partition creating step, the selected second server converts the hardware identifiers of the hardware structural elements in the second server to be allocated to the created logical partition into the same hardware identifiers as the hardware identifiers of the corresponding hardware structural elements in the first server performing the task to be taken over based on the remapping information, and wherein, in the logical partition creating step, the selected second server converts the hardware identifiers of the hardware structural elements allocated to the created logical partition for software executed in the logical partition.

3. The takeover method according to claim 2, wherein, in the second server selecting step, the management server selects a second server which includes the most hardware structural elements whose hardware identifiers match the hardware identifiers of the hardware structural elements in the first server performing the task to be taken over as the second server for taking over the task with priority, based on the remapping information.

4. The takeover method according to claim 1, wherein the management server includes a network configuration table for storing information of the hardware structural elements included in the one or more first servers and the one or more second servers and network devices connected by the hardware structural elements, and wherein, in the second server selecting step, the management server selects a second server which includes hardware structural elements connected to the same network devices as the hardware structural elements in the first server performing the task to be taken over as the second server for taking over the task, based on the network configuration table.

5. The takeover method according to claim 1, wherein, when a fault has occurred to any one of the one or more first servers, a logical partition on one of the one or more second servers take over at least one task performed in a logical partition on the first server.

6. The takeover method according to claim 1, wherein, in the second server selecting step, the management server selects a second server which includes hardware structural elements corresponding to all of the hardware structural elements in the first server and available to be used as the second server to take over, wherein, in the resource mapping information creating step, the management server creates resource mapping information showing identifiers of hardware structural elements to be allocated to logical partitions in the second server corresponding to the all of the logical partitions existing in the first server, and wherein, in the logical partition creating step, the selected second server allocates the hardware structural elements in the second servers to the logical partitions in the second server corresponding to all of the logical partitions existing in the first server.

7. A computer system comprising:
a management server,
one or more first servers performing tasks, and
one or more second servers,
wherein hardware in each server has an identifier for identification by the software executed on each server,
wherein the management server is configured to perform the steps of:
a remapping information acquisition step for acquiring hardware configuration information of hardware included in the one or more first servers and the one or more second servers, and acquiring remapping information showing a relation between the hardware included in the one or more second servers and the hardware included in the one or more first servers and states of structural elements of the hardware;

a second server selecting step for selecting, in a case where a logical partition on one of the one or more second servers takes over at least one task performed in a logical partition on one of the one or more first servers, a second server which includes hardware structural elements corresponding to the hardware structural elements of the first server performing the task to be taken over and available to be used from the one or more second servers, based on the remapping information and the hardware configuration information of the one or more first servers and the one or more second servers to determine the second server for taking over the task performed in the first server;

a resource mapping information creating step for creating resource mapping information showing identifiers of hardware structural elements to be allocated to the logical partition on the selected second server corresponding to the logical partition on the first server performing the task to be taken over;

wherein the selected second server includes a resource mapping program for mapping the hardware structural elements in the selected second server to logical partitions, and is configured to perform a logical partition creating step for creating a logical partition and allocating the hardware structural elements of the selected second server to the created logical partition corresponding to the logical partition on the first server performing the task to be taken over based on the resource mapping information, and wherein the management server is configured to further perform a takeover step for taking over the at least one task performed in the logical partition on the one or more first server to the logical partition created on the selected second server, wherein the resource mapping program includes a function to share the hardware structural elements in the selected second server by a plurality of logical partitions, and wherein, in the logical partition creating step, the selected second server allocates the hardware structural elements to the created logical partition to be shared by other logical partition in the second server, based on the remappinq information.

8. A management server installed in a computer system having a management server, one or more first servers performing tasks, and one or more second servers, each of the one or more first servers and the one or more second servers being logically partitioned into one or more, for controlling taking over, by a logical partition on one of the one or more second servers, at least one task performed in a logical partition on one of the one or more first servers, the management server comprising:

a processor;

a memory; and an interface, wherein the processor of the management server is configured to perform the steps of:

a remapping information acquisition step for acquiring hardware configuration information of hardware included in the one or more first servers and the one or more second servers, and acquiring remapping information showing a relation between the hardware included in the one or more second servers and the hardware included in the one or more first servers and states of structural elements of the hardware;

a second server selecting step for selecting, in a case where a logical partition on one of the one or more second servers takes over at least one task performed in a logical partition on one of the one or more first servers, a second server which includes hardware structural elements corresponding to the hardware structural elements in the first server performing the task to be taken over and available to be used from the one or more second servers, based on the remapping information and the hardware configuration information of the one or more first servers and the one or more second servers to determine the second server for taking over the task performed in the first server, a resource mapping information creating step for creating, by the management server, resource mapping information showing identifiers of hardware structural elements to be allocated to the logical partition on the selected second server corresponding to the logical partition on the first server performing the task to be taken over, and a takeover step, by the management server, for taking over the at least one task performed in the logical partition on the first server to a logical partition created on the selected second server, wherein the selected second server includes a resource mapping program for mapping the hardware structural elements in the selected second server to logical partitions, and is configured to perform a logical partition creating step for creating a logical partition and allocating the hardware structural elements of the selected second server to the created logical partition corresponding to the logical partition on the first server performing the task to be taken over based on resource mapping information, wherein the resource mapping program includes a function to share the hardware structural elements in the selected second server by a plurality of logical partitions, and wherein, in the logical partition creating step, the selected second server allocates the hardware structural elements to the created logical partition to be shared by other logical partition in the second server, based on the remapping information.

* * * * *